US010067712B2

United States Patent
Soran et al.

(10) Patent No.: US 10,067,712 B2
(45) Date of Patent: Sep. 4, 2018

(54) VIRTUAL DISK DRIVE SYSTEM AND METHOD

(71) Applicant: Dell International L.L.C., Round Rock, TX (US)

(72) Inventors: Philip E. Soran, Edina, MN (US); John P. Guider, North Oaks, MN (US); Lawrence E. Aszmann, Prior Lake, MN (US); Michael J. Klemm, Minnetonka, MN (US)

(73) Assignee: Dell International L.L.C., Round Rock, TX (US)

( * ) Notice: Subject to any disclaimer, the term of this patent is extended or adjusted under 35 U.S.C. 154(b) by 98 days.

(21) Appl. No.: 15/240,653

(22) Filed: Aug. 18, 2016

(65) Prior Publication Data

US 2016/0357446 A1 Dec. 8, 2016

Related U.S. Application Data

(63) Continuation of application No. 14/715,838, filed on May 19, 2015, now Pat. No. 9,436,390, which is a (Continued)

(51) Int. Cl.
*G06F 11/00* (2006.01)
*G06F 3/06* (2006.01)
(Continued)

(52) U.S. Cl.
CPC .............. *G06F 3/065* (2013.01); *G06F 3/064* (2013.01); *G06F 3/067* (2013.01); *G06F 3/0608* (2013.01);
(Continued)

(58) Field of Classification Search
CPC .............. G06F 11/2089; G06F 11/108; G06F 11/1471; G06F 11/1461; G06F 11/1435;
(Continued)

(56) References Cited

U.S. PATENT DOCUMENTS 5,155,835 A 10/1992 Belsan
5,274,807 A 12/1993 Hoshen et al.
(Continued)

FOREIGN PATENT DOCUMENTS

EP 0757317 2/1997
EP 0780758 6/1997
(Continued)

OTHER PUBLICATIONS

The Compaq Enterprise Network Storage Architecture: An Overview, source(s): Compaq, May 2000, pp. 1-22.
(Continued)

*Primary Examiner* — Nadeem Iqbal
(74) *Attorney, Agent, or Firm* — Winthrop & Weinstine, P.A.

(57) ABSTRACT

A disk drive system and method capable of dynamically allocating data is provided. The disk drive system may include a RAID subsystem having a pool of storage, for example a page pool of storage that maintains a free list of RAIDs, or a matrix of disk storage blocks that maintain a null list of RAIDs, and a disk manager having at least one disk storage system controller. The RAID subsystem and disk manager dynamically allocate data across the pool of storage and a plurality of disk drives based on RAID-to-disk mapping. The RAID subsystem and disk manager determine whether additional disk drives are required, and a notification is sent if the additional disk drives are required. Dynamic data allocation and data progression allow a user to acquire a disk drive later in time when it is needed. Dynamic data allocation also allows efficient data storage of snapshots/point-in-time copies of virtual volume pool of storage, instant data replay and data instant fusion for data backup, recovery etc., remote data storage, and data progression, etc.

18 Claims, 25 Drawing Sheets

Related U.S. Application Data continuation of application No. 14/052,822, filed on Oct. 14, 2013, now Pat. No. 9,047,216, which is a continuation of application No. 13/171,829, filed on Jun. 29, 2011, now Pat. No. 8,560,880, which is a continuation of application No. 12/261,621, filed on Oct. 30, 2008, now Pat. No. 8,020,036, which is a continuation of application No. 10/918,329, filed on Aug. 13, 2004, now Pat. No. 7,613,945.

(60) Provisional application No. 60/495,204, filed on Aug. 14, 2003.

(51) Int. Cl.
    *G06F 11/14*     (2006.01)
    *G06F 12/02*     (2006.01)
    *G06F 11/10*     (2006.01)
    *G06F 11/20*     (2006.01)

(52) U.S. Cl.
CPC .......... *G06F 3/0611* (2013.01); *G06F 3/0619* (2013.01); *G06F 3/0631* (2013.01); *G06F 3/0647* (2013.01); *G06F 3/0659* (2013.01); *G06F 3/0665* (2013.01); *G06F 3/0683* (2013.01); *G06F 3/0689* (2013.01); *G06F 11/108* (2013.01); *G06F 11/1435* (2013.01); *G06F 12/02* (2013.01); *G06F 11/1461* (2013.01); *G06F 11/1471* (2013.01); *G06F 11/2089* (2013.01); *G06F 2201/84* (2013.01)

(58) Field of Classification Search
CPC .... G06F 3/0608; G06F 3/0631; G06F 3/0665; G06F 3/067
See application file for complete search history.

(56) References Cited

U.S. PATENT DOCUMENTS

| | | |
|---|---|---|
| 5,276,867 A | 1/1994 | Kenley et al. |
| 5,327,535 A | 7/1994 | Ogata et al. |
| 5,331,646 A | 7/1994 | Kreuger et al. |
| 5,371,882 A | 12/1994 | Ludlam |
| 5,379,412 A | 1/1995 | Eastridge et al. |
| 5,390,327 A | 2/1995 | Lubbers |
| 5,392,244 A | 2/1995 | Jacobson et al. |
| 5,502,836 A | 3/1996 | Hale et al. |
| 5,548,740 A | 8/1996 | Kiyohara |
| 5,553,285 A | 9/1996 | Krakauer et al. |
| 5,572,661 A | 11/1996 | Jacobson |
| 5,613,088 A | 3/1997 | Achiwa et al. |
| 5,644,701 A | 7/1997 | Takewaki |
| 5,659,704 A | 8/1997 | Burkes et al. |
| 5,664,187 A | 9/1997 | Burkes et al. |
| 5,696,934 A | 12/1997 | Jacobson et al. |
| 5,742,792 A | 4/1998 | Yanai et al. |
| 5,784,698 A | 7/1998 | Brady et al. |
| 5,829,053 A | 10/1998 | Smith et al. |
| 5,835,953 A | 11/1998 | Ohran |
| 5,897,661 A | 4/1999 | Baranovsky et al. |
| 5,933,834 A | 8/1999 | Aichelen |
| 5,974,515 A | 10/1999 | Bachmat et al. |
| RE36,462 E | 12/1999 | Chang et al. |
| 6,052,759 A | 4/2000 | Stallmo et al. |
| 6,052,797 A | 4/2000 | Ofek et al. |
| 6,058,489 A | 5/2000 | Schultz et al. |
| 6,070,249 A | 5/2000 | Lee |
| 6,073,218 A | 6/2000 | Dekoning et al. |
| 6,073,221 A | 6/2000 | Beal et al. |
| 6,073,222 A | 6/2000 | Ohran |
| 6,078,932 A | 6/2000 | Haye et al. |
| 6,085,262 A | 7/2000 | Sawada |
| 6,085,298 A | 7/2000 | Ohran |
| RE36,846 E | 8/2000 | Ng et al. |
| 6,115,781 A | 9/2000 | Howard |
| 6,115,788 A | 9/2000 | Thowe |
| 6,131,148 A | 10/2000 | West et al. |
| 6,170,037 B1 | 1/2001 | Blumenau |
| 6,173,361 B1 | 1/2001 | Taketa |
| 6,192,444 B1 | 2/2001 | White et al. |
| 6,209,059 B1 | 3/2001 | Ofer et al. |
| 6,212,531 B1 | 4/2001 | Blea et al. |
| 6,215,747 B1 | 4/2001 | Jobs |
| 6,269,431 B1 | 7/2001 | Dunham |
| 6,269,453 B1 | 7/2001 | Krantz |
| 6,275,897 B1 | 8/2001 | Bachmat |
| 6,275,898 B1 | 8/2001 | DeKoning |
| 6,282,671 B1 | 8/2001 | Islam et al. |
| 6,311,251 B1 | 10/2001 | Merritt et al. |
| 6,341,341 B1 | 1/2002 | Grummon et al. |
| 6,347,359 B1 | 2/2002 | Smith et al. |
| 6,353,878 B1 | 3/2002 | Dunham |
| 6,356,969 B1 | 3/2002 | DeKoning et al. |
| 6,366,987 B1 | 4/2002 | Tzelnic et al. |
| 6,366,988 B1 | 4/2002 | Skiba et al. |
| 6,415,296 B1 | 7/2002 | Challener et al. |
| 6,434,681 B1 | 8/2002 | Armangau |
| 6,438,638 B1 | 8/2002 | Jones et al. |
| 6,457,098 B1 | 9/2002 | DeKonig et al. |
| 6,516,425 B1 | 2/2003 | Belhadj et al. |
| 6,560,615 B1 | 5/2003 | Zayas et al. |
| 6,584,582 B1 | 6/2003 | O'Connor |
| 6,591,335 B1 | 7/2003 | Sade et al. |
| 6,604,171 B1 | 8/2003 | Sade |
| 6,611,897 B2 | 8/2003 | Komachiya et al. |
| 6,618,794 B1 | 9/2003 | Sicola et al. |
| 6,631,493 B2 | 10/2003 | Ottesen et al. |
| 6,636,778 B2 | 10/2003 | Basham et al. |
| 6,718,436 B2 | 4/2004 | Kim et al. |
| 6,732,125 B1 | 5/2004 | Autrey |
| 6,799,258 B1 | 9/2004 | Linde |
| 6,804,755 B2 | 10/2004 | Selkirk et al. |
| 6,826,711 B2 | 11/2004 | Moulton et al. |
| 6,839,827 B1 | 1/2005 | Beardsley et al. |
| 6,839,864 B2 | 1/2005 | Mambakkam et al. |
| 6,857,057 B2 | 2/2005 | Nelson et al. |
| 6,857,059 B2 | 2/2005 | Karpoff et al. |
| 6,859,882 B2 | 2/2005 | Fung |
| 6,862,609 B2 | 3/2005 | Merkey |
| 6,871,295 B2 | 3/2005 | Ulrich et al. |
| 6,877,109 B2 | 4/2005 | Delaney et al. |
| 6,880,059 B2 | 4/2005 | Mizuno et al. |
| 6,883,065 B1 | 4/2005 | Pittlekow et al. |
| 6,904,441 B2 | 6/2005 | Voigt |
| 6,904,599 B1 | 6/2005 | Cabrera et al. |
| 6,907,505 B2 | 6/2005 | Cochran et al. |
| 6,912,585 B2 | 6/2005 | Taylor et al. |
| 6,915,241 B2 | 7/2005 | Kohlmorgen et al. |
| 6,915,397 B2 | 7/2005 | Lubbers et al. |
| 6,915,454 B1 | 7/2005 | Moore et al. |
| 6,938,123 B2 | 8/2005 | Willis et al. |
| 6,948,038 B2 | 9/2005 | Berkowitz et al. |
| 6,952,794 B2 | 10/2005 | Lu |
| 6,957,294 B1 | 10/2005 | Saunders et al. |
| 6,957,362 B2 | 10/2005 | Armangau |
| 6,981,114 B1 | 12/2005 | Wu et al. |
| 6,996,582 B2 | 2/2006 | Daniels et al. |
| 6,996,741 B1 | 2/2006 | Pittlekow et al. |
| 7,000,069 B2 | 2/2006 | Bruning et al. |
| 7,003,567 B2 | 2/2006 | Suzuki et al. |
| 7,003,688 B1 | 2/2006 | Pittlekow et al. |
| 7,017,076 B2 | 3/2006 | Ohno et al. |
| 7,032,093 B1 | 4/2006 | Cameron |
| 7,032,119 B2 | 4/2006 | Fung |
| 7,039,778 B2 | 5/2006 | Yamasaki |
| 7,043,663 B1 | 5/2006 | Pittlekow et al. |
| 7,047,358 B2 | 5/2006 | Lee et al. |
| 7,051,182 B2 | 5/2006 | Blumenau et al. |
| 7,058,788 B2 | 6/2006 | Niles et al. |
| 7,058,826 B2 | 6/2006 | Fung |
| 7,069,468 B1 | 6/2006 | Olson et al. |
| 7,072,916 B1 | 7/2006 | Lewis et al. |
| 7,085,899 B2 | 8/2006 | Kim et al. |

(56) References Cited

U.S. PATENT DOCUMENTS

| | | |
|---|---|---|
| 7,085,956 B2 | 8/2006 | Petersen et al. |
| 7,089,395 B2 | 8/2006 | Jacobson et al. |
| 7,092,977 B2 | 8/2006 | Leung et al. |
| 7,093,158 B2 | 8/2006 | Barron et al. |
| 7,093,161 B1 | 8/2006 | Mambakkam et al. |
| 7,100,080 B2 | 8/2006 | Howe |
| 7,103,740 B1 | 9/2006 | Colgrove et al. |
| 7,103,798 B2 | 9/2006 | Morita |
| 7,107,417 B2 | 9/2006 | Gibble et al. |
| 7,111,084 B2 | 9/2006 | Tan et al. |
| 7,111,147 B1 | 9/2006 | Strange et al. |
| 7,124,272 B1 | 10/2006 | Kennedy et al. |
| 7,127,633 B1 | 10/2006 | Olson et al. |
| 7,133,884 B1 | 11/2006 | Murley et al. |
| 7,134,011 B2 | 11/2006 | Fung |
| 7,134,053 B1 | 11/2006 | Moore |
| 7,162,587 B2 | 1/2007 | Hiken et al. |
| 7,162,599 B2 | 1/2007 | Berkowitz et al. |
| 7,181,581 B2 | 2/2007 | Burkey |
| 7,184,933 B2 | 2/2007 | Prekeges et al. |
| 7,191,304 B1 | 3/2007 | Cameron et al. |
| 7,194,653 B1 | 3/2007 | Hadders et al. |
| 7,197,614 B2 | 3/2007 | Nowakowski |
| 7,216,258 B2 | 5/2007 | Ebsen et al. |
| 7,222,205 B2 | 5/2007 | Jones et al. |
| 7,225,317 B1 | 5/2007 | Glade et al. |
| 7,228,441 B2 | 6/2007 | Fung |
| 7,237,129 B2 | 6/2007 | Fung |
| 7,251,713 B1 | 7/2007 | Zhang |
| 7,254,813 B2 | 8/2007 | Leong et al. |
| 7,272,666 B2 | 9/2007 | Rowan et al. |
| 7,272,735 B2 | 9/2007 | Fung |
| 7,293,196 B2 | 11/2007 | Hiken et al. |
| 7,305,579 B2 | 12/2007 | Williams |
| 7,320,052 B2 | 1/2008 | Zimmer et al. |
| 7,334,156 B2 | 2/2008 | Land et al. |
| 7,380,113 B2 | 5/2008 | Ebsen et al. |
| 7,383,379 B2 | 6/2008 | Patterson et al. |
| 7,398,418 B2 | 7/2008 | Soran et al. |
| 7,404,102 B2 | 7/2008 | Soran et al. |
| 7,406,631 B2 | 7/2008 | Moore |
| 7,424,637 B1 | 9/2008 | Schoenthal et al. |
| 7,457,982 B2 | 11/2008 | Rajan |
| 7,475,098 B2 | 1/2009 | Patterson et al. |
| 7,484,111 B2 | 1/2009 | Fung |
| 7,493,514 B2 | 2/2009 | Soran et al. |
| 7,512,822 B2 | 3/2009 | Fung |
| 7,533,283 B2 | 5/2009 | Fung |
| 7,539,991 B2 | 5/2009 | Leong et al. |
| 7,552,350 B2 | 6/2009 | Fung |
| 7,558,976 B2 | 7/2009 | Fung |
| 7,562,239 B2 | 7/2009 | Fung |
| 7,574,622 B2 | 8/2009 | Soran et al. |
| 7,603,532 B2 | 10/2009 | Rajan et al. |
| 7,613,945 B2 * | 11/2009 | Soran .................. G06F 3/0608 714/5.11 |
| 7,672,226 B2 | 3/2010 | Shea |
| 7,702,948 B1 | 4/2010 | Kalman et al. |
| 7,849,352 B2 | 12/2010 | Soran et al. |
| 7,945,810 B2 | 5/2011 | Soran et al. |
| 7,962,778 B2 | 6/2011 | Soran et al. |
| 8,020,036 B2 | 9/2011 | Soran et al. |
| 8,046,469 B2 | 10/2011 | Lubbers et al. |
| 8,555,108 B2 | 10/2013 | Soran et al. |
| 8,560,880 B2 | 10/2013 | Soran et al. |
| 9,047,216 B2 * | 6/2015 | Soran .................. G06F 3/0608 |
| 2001/0020282 A1 | 9/2001 | Murotani et al. |
| 2002/0004912 A1 | 1/2002 | Fung |
| 2002/0004913 A1 | 1/2002 | Fung |
| 2002/0004915 A1 | 1/2002 | Fung |
| 2002/0007438 A1 | 1/2002 | Lee |
| 2002/0007463 A1 | 1/2002 | Fung |
| 2002/0007464 A1 | 1/2002 | Fung |
| 2002/0046320 A1 | 4/2002 | Shaath |
| 2002/0053009 A1 | 5/2002 | Selkirk et al. |
| 2002/0056031 A1 | 5/2002 | Skiba et al. |
| 2002/0062454 A1 | 5/2002 | Fung |
| 2002/0073278 A1 | 6/2002 | McDowell |
| 2002/0087813 A1 | 7/2002 | Harris et al. |
| 2002/0095546 A1 | 7/2002 | Dimitri et al. |
| 2002/0099908 A1 * | 7/2002 | Yamamoto ............ G06F 3/0605 711/114 |
| 2002/0103969 A1 | 8/2002 | Koizumi et al. |
| 2002/0112113 A1 | 8/2002 | Karpoff et al. |
| 2002/0129214 A1 | 9/2002 | Sarkar |
| 2002/0129216 A1 | 9/2002 | Collins |
| 2002/0166079 A1 | 11/2002 | Ulrich et al. |
| 2002/0178335 A1 | 11/2002 | Selkirk et al. |
| 2002/0186492 A1 | 12/2002 | Smith |
| 2002/0188768 A1 | 12/2002 | Hirakawa et al. |
| 2002/0199129 A1 | 12/2002 | Bohrer et al. |
| 2003/0005248 A1 | 1/2003 | Selkirk et al. |
| 2003/0009619 A1 | 1/2003 | Kano et al. |
| 2003/0033577 A1 | 2/2003 | Anderson |
| 2003/0046270 A1 | 3/2003 | Leung et al. |
| 2003/0065901 A1 | 4/2003 | Krishnamurthy |
| 2003/0079014 A1 | 4/2003 | Lubbers et al. |
| 2003/0110263 A1 | 6/2003 | Shillo |
| 2003/0140207 A1 | 7/2003 | Nagase et al. |
| 2003/0182301 A1 | 9/2003 | Patterson et al. |
| 2003/0182503 A1 | 9/2003 | Leong et al. |
| 2003/0188097 A1 | 10/2003 | Holland et al. |
| 2003/0188114 A1 | 10/2003 | Lubbers et al. |
| 2003/0188208 A1 | 10/2003 | Fung |
| 2003/0200473 A1 | 10/2003 | Fung |
| 2003/0212865 A1 | 11/2003 | Hiken et al. |
| 2003/0212872 A1 | 11/2003 | Patterson et al. |
| 2003/0221060 A1 | 11/2003 | Umberger et al. |
| 2003/0231529 A1 | 12/2003 | Hetrick et al. |
| 2004/0015655 A1 | 1/2004 | Willis et al. |
| 2004/0030822 A1 | 2/2004 | Rajan et al. |
| 2004/0030951 A1 | 2/2004 | Armangau |
| 2004/0068522 A1 | 4/2004 | Daniels et al. |
| 2004/0068637 A1 | 4/2004 | Nelson et al. |
| 2004/0073747 A1 | 4/2004 | Lu |
| 2004/0088505 A1 | 5/2004 | Watanabe |
| 2004/0107222 A1 | 6/2004 | Venkatesh et al. |
| 2004/0107315 A1 | 6/2004 | Watanabe et al. |
| 2004/0111558 A1 | 6/2004 | Kistler et al. |
| 2004/0117572 A1 | 6/2004 | Welsh et al. |
| 2004/0133742 A1 | 7/2004 | Vasudevan et al. |
| 2004/0163009 A1 | 8/2004 | Goldstein et al. |
| 2004/0172577 A1 | 9/2004 | Tan et al. |
| 2005/0010618 A1 | 1/2005 | Hayden |
| 2005/0010731 A1 | 1/2005 | Zalewki et al. |
| 2005/0027938 A1 | 2/2005 | Burkey |
| 2005/0050270 A1 | 3/2005 | Horn et al. |
| 2005/0055603 A1 | 3/2005 | Soran et al. |
| 2005/0065962 A1 | 3/2005 | Rowan et al. |
| 2005/0081086 A1 | 4/2005 | Williams |
| 2005/0108582 A1 | 5/2005 | Fung |
| 2005/0114350 A1 | 5/2005 | Rose et al. |
| 2005/0144512 A1 | 6/2005 | Ming |
| 2005/0166085 A1 | 7/2005 | Thompson et al. |
| 2005/0182992 A1 | 8/2005 | Land et al. |
| 2005/0193058 A1 | 9/2005 | Yasuda et al. |
| 2005/0262325 A1 | 11/2005 | Shmueli et al. |
| 2006/0031287 A1 | 2/2006 | Ulrich |
| 2006/0041718 A1 | 2/2006 | Ulrich et al. |
| 2006/0059306 A1 | 3/2006 | Tseng |
| 2006/0093282 A1 | 5/2006 | Shepherd et al. |
| 2006/0107006 A1 | 5/2006 | Green et al. |
| 2006/0107097 A1 | 5/2006 | Zohar et al. |
| 2006/0161752 A1 | 7/2006 | Burkey |
| 2006/0161808 A1 | 7/2006 | Burkey |
| 2006/0179218 A1 | 8/2006 | Burkey |
| 2006/0184821 A1 | 8/2006 | Hitz et al. |
| 2006/0206536 A1 | 9/2006 | Sawdon et al. |
| 2006/0206665 A1 | 9/2006 | Orsley |
| 2006/0206675 A1 | 9/2006 | Sato et al. |
| 2006/0218360 A1 | 9/2006 | Burkey |
| 2006/0218367 A1 | 9/2006 | Ukai et al. |
| 2006/0218433 A1 | 9/2006 | Williams |
| 2006/0230244 A1 | 10/2006 | Amarendran et al. |

(56) References Cited

U.S. PATENT DOCUMENTS

| | | |
|---|---|---|
| 2006/0248324 A1 | 11/2006 | Fung |
| 2006/0248325 A1 | 11/2006 | Fung |
| 2006/0248358 A1 | 11/2006 | Fung |
| 2006/0248359 A1 | 11/2006 | Fung |
| 2006/0248360 A1 | 11/2006 | Fung |
| 2006/0248361 A1 | 11/2006 | Fung |
| 2006/0248379 A1 | 11/2006 | Jernigan, IV |
| 2006/0253669 A1 | 11/2006 | Lobdell |
| 2006/0253717 A1 | 11/2006 | Fung |
| 2006/0259797 A1 | 11/2006 | Fung |
| 2006/0265608 A1 | 11/2006 | Fung |
| 2006/0265609 A1 | 11/2006 | Fung |
| 2006/0271604 A1 | 11/2006 | Shoens |
| 2006/0277361 A1 | 12/2006 | Sharma et al. |
| 2006/0277432 A1 | 12/2006 | Patel et al. |
| 2007/0005885 A1 | 1/2007 | Kobayashi et al. |
| 2007/0011425 A1 | 1/2007 | Sicola |
| 2007/0016749 A1 | 1/2007 | Nakamura et al. |
| 2007/0016754 A1 | 1/2007 | Testardi |
| 2007/0101173 A1 | 5/2007 | Fung |
| 2007/0168709 A1 | 7/2007 | Morita |
| 2007/0180306 A1 | 8/2007 | Soran et al. |
| 2007/0220313 A1 | 9/2007 | Katsuragi et al. |
| 2007/0234109 A1 | 10/2007 | Soran et al. |
| 2007/0234110 A1 | 10/2007 | Soran et al. |
| 2007/0234111 A1 | 10/2007 | Soran et al. |
| 2007/0240006 A1 | 10/2007 | Fung |
| 2007/0245084 A1 | 10/2007 | Yagisawa et al. |
| 2007/0245165 A1 | 10/2007 | Fung |
| 2007/0260830 A1 | 11/2007 | Faibish et al. |
| 2007/0266066 A1 | 11/2007 | Kapoor et al. |
| 2007/0288401 A1 | 12/2007 | Hood et al. |
| 2008/0005468 A1 | 1/2008 | Faibish et al. |
| 2008/0091877 A1 | 4/2008 | Klemm et al. |
| 2008/0104139 A1 | 5/2008 | Xu et al. |
| 2008/0244172 A1 | 10/2008 | Kano |
| 2008/0288546 A1 | 11/2008 | Adkins et al. |
| 2009/0083563 A1 | 3/2009 | Murase |
| 2009/0132616 A1 | 5/2009 | Winter et al. |
| 2009/0132617 A1 | 5/2009 | Soran et al. |
| 2009/0138755 A1 | 5/2009 | Soran et al. |
| 2009/0235104 A1 | 9/2009 | Fung |
| 2009/0300412 A1 | 12/2009 | Soran et al. |
| 2010/0037023 A1 | 2/2010 | Aszmann et al. |
| 2011/0258388 A1 | 10/2011 | Saran et al. |
| 2012/0124285 A1 | 5/2012 | Soran et al. |
| 2012/0166725 A1 | 6/2012 | Soran et al. |
| 2012/0221683 A1 | 8/2012 | Ferris |
| 2012/0317337 A1 | 12/2012 | Johar et al. |
| 2013/0238854 A1 | 9/2013 | Edwards et al. |
| 2014/0108858 A1 | 4/2014 | Soran et al. |
| 2016/0357446 A1* | 12/2016 | Soran .............. G06F 3/0608 |

FOREIGN PATENT DOCUMENTS

| | | |
|---|---|---|
| EP | 1462927 | 9/2004 |
| EP | 0706113 | 8/2005 |
| GB | 2373075 | 9/2002 |
| JP | 1790351987 | 8/1987 |
| JP | 3259320 | 11/1991 |
| JP | 732211993 | 3/1993 |
| JP | 1872011994 | 7/1994 |
| JP | 07084839 | 3/1995 |
| JP | 847321995 | 3/1995 |
| JP | 7200367 | 8/1995 |
| JP | 844503 | 2/1996 |
| JP | 8278850 | 10/1996 |
| JP | 443811997 | 2/1997 |
| JP | 690281997 | 3/1997 |
| JP | 9128305 | 5/1997 |
| JP | 1283051997 | 5/1997 |
| JP | 5108061997 | 10/1997 |
| JP | 2546281998 | 9/1998 |
| JP | 1341171999 | 5/1999 |
| JP | 3278031999 | 11/1999 |
| JP | 2000132343 | 5/2000 |
| JP | 2000163290 | 6/2000 |
| JP | 2000507014 | 6/2000 |
| JP | 2001051882 | 2/2001 |
| JP | 2001067187 | 3/2001 |
| JP | 2001147785 | 5/2001 |
| JP | 2001337850 | 12/2001 |
| JP | 2001344139 | 12/2001 |
| JP | 200232197 | 1/2002 |
| JP | 200273393 | 3/2002 |
| JP | 2002082775 | 3/2002 |
| JP | 2002182860 | 6/2002 |
| JP | 2002278819 | 9/2002 |
| JP | 2002366398 | 12/2002 |
| JP | 200315915 | 1/2003 |
| JP | 200350724 | 2/2003 |
| JP | 2003108317 | 4/2003 |
| JP | 2003196127 | 7/2003 |
| JP | 2004272324 | 9/2004 |
| JP | 2005018612 | 1/2005 |
| JP | 2005512191 | 4/2005 |
| JP | 2006024024 | 1/2006 |
| WO | 9523376 | 8/1995 |
| WO | 9735269 | 9/1997 |
| WO | 0013077 | 3/2000 |
| WO | 0131431 | 5/2001 |
| WO | 0225445 | 3/2002 |
| WO | 2003014909 | 2/2003 |
| WO | 03028183 | 4/2003 |
| WO | 03048941 | 6/2003 |
| WO | 2003050707 | 6/2003 |
| WO | 2005017737 | 2/2005 |

OTHER PUBLICATIONS

Massiglia, P., "Chapter 11: Dynamic Data Mapping", The RAIDbook. A Source for RAID Technology, Feb. 1997; pp. 197-208.

Wilkes, John, et al. "The HP AutoRAID Hierarchical Storage System", ACM Transactions on Computer Systems, Association for Computing Machinery, ACM Transactions on Computer Systems, vol. 14, No. 1, Feb. 1996, pp. 108-136.

The PC Guide, "RAID Level 7", 2001, Retrieved from http://www.pcguide.com/ref/hdd/perf/raid/levels/singleLevel7-c.html on Sep. 13, 2010, 3 pp.

Bolosky, W. J. et al. "Distributed Schedule Management in the Tiger Video Fileserver", Abstract 1997, 212-223.

Cheung, L. "Design and Optimization of Distributed RAID Storage Systems", Research Paper, CS555 Section A, Fall 2002 (15 pp.).

Jin, H. et al. "Improving Partial Stripe Write Performance in Raid Level 5", Department of Computer Science and Technology, Huazong University of Science and Technology, Wuhan, 430074, P.R. China 1999, pp. 396-400.

Scheuermann, P. et al. "Data Partitioning and Load Balancing in Parallel Disk Systems", Springer-Verlug 1998 (9 pp.).

Schomaker, G. et al. "DHHT-RAID: A Distributed Heterogenous Scalable Architecture for Dynamic Storage Environments", 21st International Conference on Advanced Networking and Applications (AINA '07) 2007 (9 pp.).

Thomasian, A. et al. "A Performance Evaluation Tool for RAID Disk Arrays", source(s): New Jersey Institute of Technology—NJIT, Proceeding of the First International Conference on the Quantitative Evaluation of Systems (QEST'04), Sep. 27-30, 2004, 10 pp.

Menon, J. et al. "Algorithms for Software and Low-Cost Hardware RAIDs", IBM Almaden Research Center, menonjm@almaden.ibm.com, Copyright 1995, pp. 411-418.

Zadok, E. et al. "Reducing Storage Management Costs via Informed User-Based Policies", Technical Report FSL-03-01, Aug. 14, 2003 (26 pp.).

Hwang, K. et al. "Orthogonal Striping and Mirroring in Distributed RAID for I/O-Centric Cluster Computing", IEEE Transactions on Parallel and Distributed Systems, vol. 13, No. 1, Jan. 2002, pp. 26-44.

(56) References Cited

OTHER PUBLICATIONS

Loazia, J. "Optimal storage configuration made easy", White paper 295, Oracle Corporation, Redwood Shores, CA, 2002.

Thornock, Niki et al. "A stochastic I/O simulation technique", Proceedings of the 29th conference on Winter simulation (WSC '97), Dec. 7-10, 1997. IEEE Computer Society, Washington, D.C., U.S.A., pp. 1079-1086.

PCGuide article "Logical Block Addressing" [online]. 2001 [retrieved on Jun. 26, 2011]. Retrieved from the Internet: <URL:http://www.pcguide.com/ref/hdd/bios/modesLBA-c.html>.

Vongsathorn, P. et al. (1990) "A system for adaptive disk rearrangement", Software: Practice and Experience, 20: 225-242.

Akyurek S. et al. "Adaptive block rearrangement", ACM Trans. Comput. Syst. 13, 2 (May 1995), pp. 89-121.

Sarhan, N.J. "Adaptive block rearrangement algorithms for video-on-demand server," Parallel Processing, International Conference on, 2001. vol., No. pp. 452-459, Sep. 3-7, 2001 doi: 10.1109/ICPP.2001.952092 URL:<http://ieeexplore.ieee.org/stamp/stamp.jsp?tp=arnumber=952092&isnumber=20585>.

Geist, Robert et al. (1992) "Disk performance enhancement through Markov-based cylinder remapping", Proceedings of the 30th annual Southeast regional conference (ACM-SE 30). ACM, New York, NY, USA, 23-28.

Vakali, Athena et al. "Data placement schemes in replicated mirrored disk systems", Journey of Systems and Software, vol. 55, Issue 2, Dec. 27, 2000, pp. 115-128, ISSN 0164-1212, DOI: 10.1016/S0164-1212(00)00065-0. <http://www.sciencedirect.com/science/article/pii/S0164121200000650>.

Mogi, Kazuhiko, "Performance Tuning Function in RAID Device", Technical Report of the Institute of Electronics, Information and Communication Engineers, vol. 101, No. 342, Japan, Institute of Electronics, Information, and Communication Engineers, Oct. 4, 2001, pp. 9-16.

Kim, Jeong-Won et al. "An Effective Video Block Placement Scheme on VOD Server Based on Multi-zone Recording Disks", IEEE International Conference of Multimedia Computing and Systems '97, Jun. 3-6, 1997, pp. 29-36.

Wang, Jun et al. "PROFS—Performance-Oriented Data Reorganziation for Log-structured File System on Multi-zone Disks", Ninth International Symposium on Modeling, Analysis and Simulation of Computer and Telecommunication Systems, Aug. 15-18, 2001, pp. 285-292.

* cited by examiner

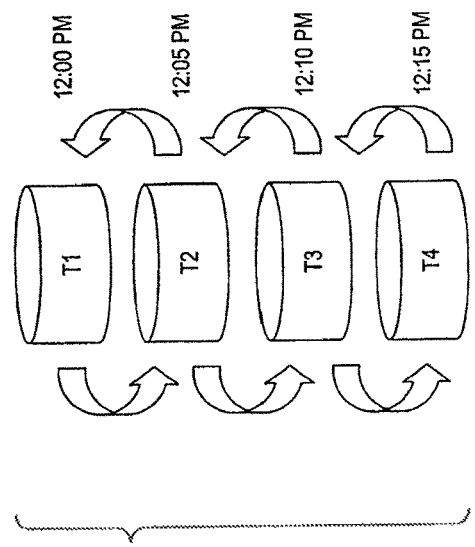
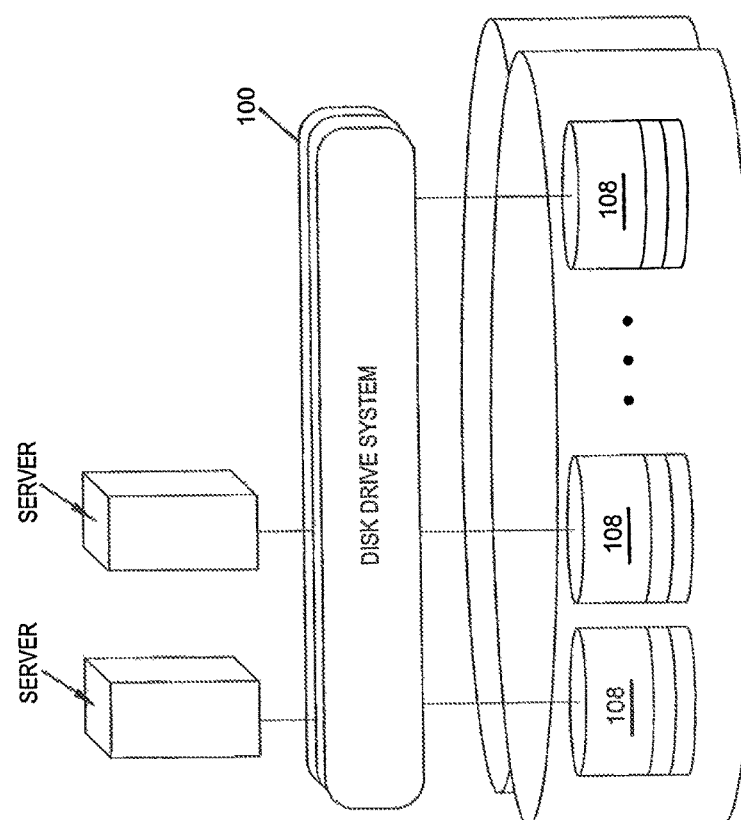
FIG. 3A
FIG. 3B

- BACKUP
- REPORTS
- LOCAL FAILURE
- TESTING

- VIRUS OR CYBER INTRUSION
- SW FAILURE/CORRUPTION
- SERVER CORRUPTION

- NATURAL DISASTER
- SITE DISRUPTION
- POWER OUTAGE

- CENTRALIZED BACKUP
- VAULTING
- DATA CENTER MOVE

POINT TO POINT

POINT TO MULTIPOINT

PEER TO PEER

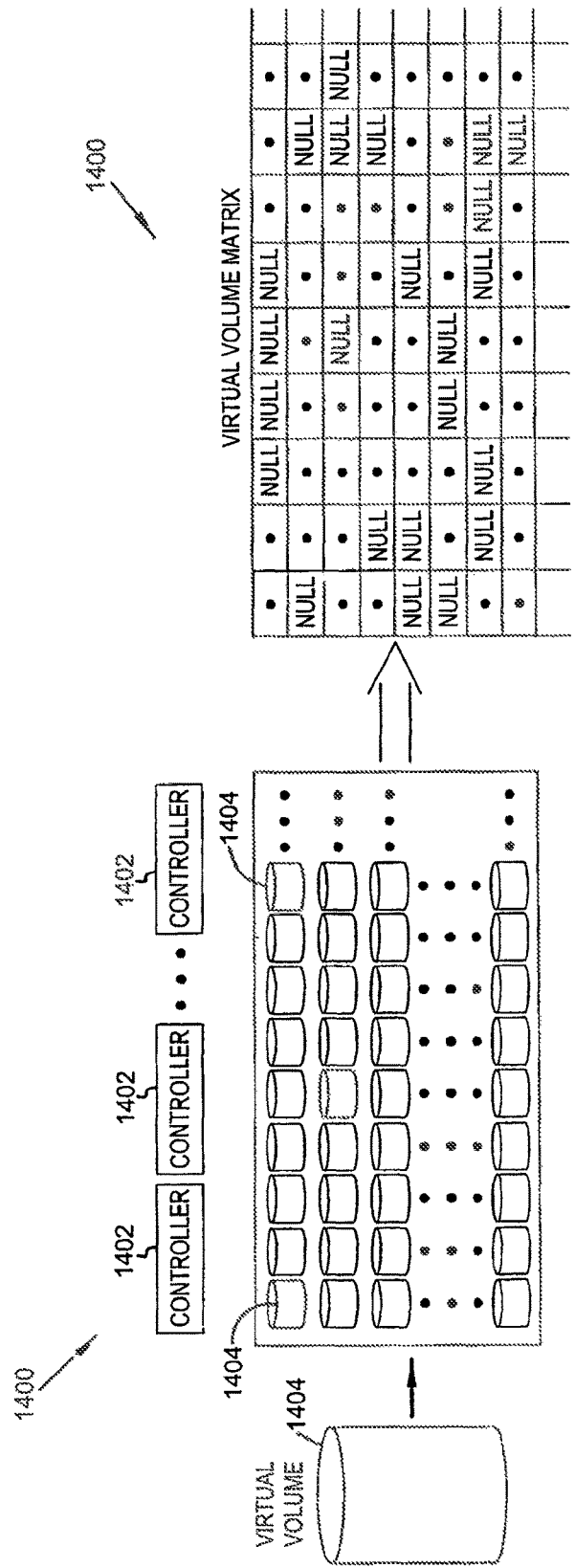

FIG. 14C
| PAGE # | 0 | 1 | 2 | 3 | 4 | 5 | ... |
|---|---|---|---|---|---|---|---|
| RAID DEVICE | 1 | 2 | 1 | 3 | NULL | 3 | ... |
| RAID PAGE # | 54 | 1 | 52 | 112 | NULL | 64 | ... |
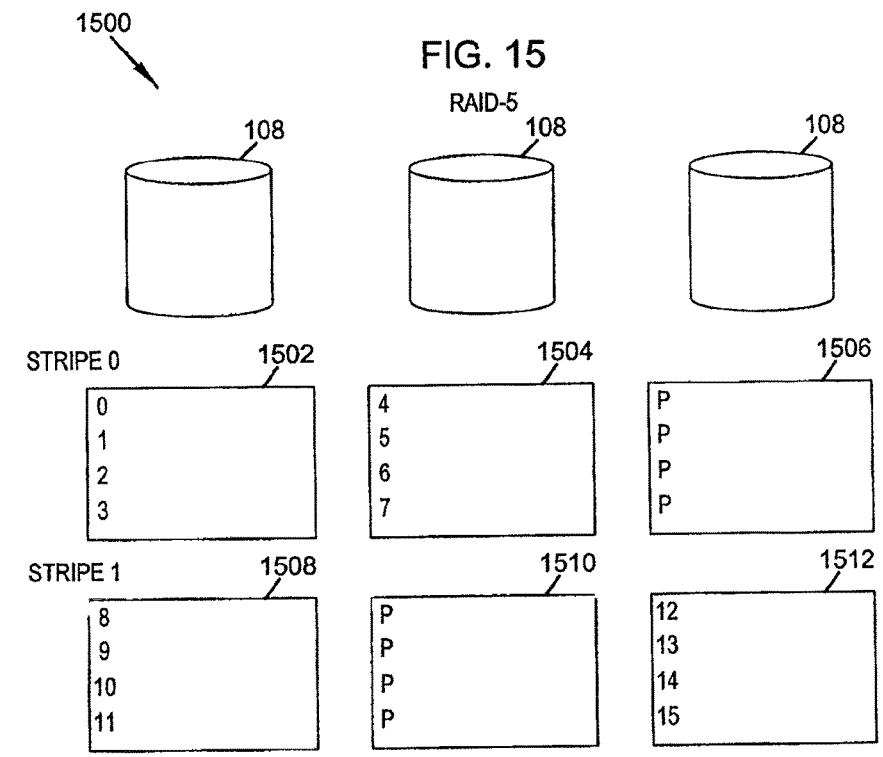
FIG. 15
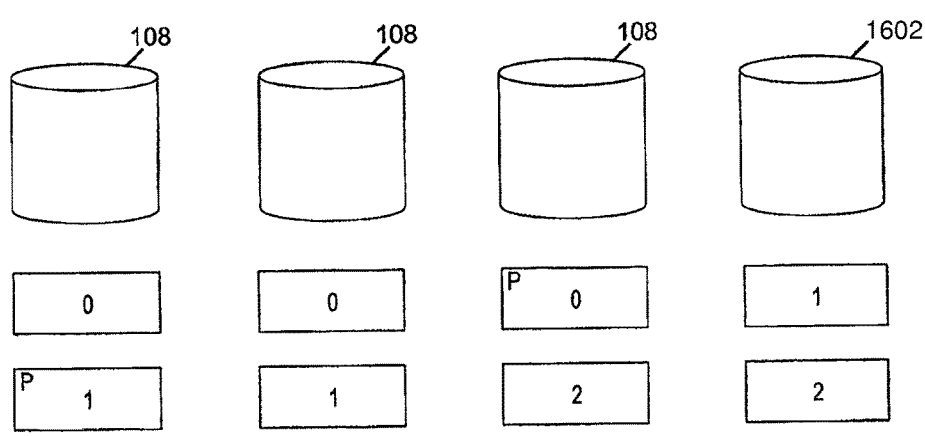
FIG. 16

FIG. 17

| C WRITABLE | B HISTORICAL | A OLDEST HISTORICAL |
|---|---|---|
| | B5 ACCESSIBLE HISTORICAL - RO | |
| C3 ACCESSIBLE RW | | A4 ACCESSIBLE HISTORICAL - RO |
| C2 ACCESSIBLE RW | B3 NON-ACCESSIBLE HISTORICAL - RO | A3 NON-ACCESSIBLE HISTORICAL - RO |
| | | A1 ACCESSIBLE HISTORICAL - RO |

VIRTUAL DISK DRIVE SYSTEM AND METHOD

CROSS-REFERENCE TO RELATED APPLICATION(S)

The present utility patent application is a continuation of U.S. patent application Ser. No. 14/715,838, filed May 19, 2015, which is a continuation of U.S. patent application Ser. No. 14/052,822, filed Oct. 14, 2013, now U.S. Pat. No. 9,047,216, which is a continuation of U.S. patent application Ser. No. 13/171,829, filed Jun. 29, 2011, now U.S. Pat. No. 8,560,880, which is a continuation of U.S. patent application Ser. No. 12/261,621, filed Oct. 30, 2008, now U.S. Pat. No. 8,020,036, which is a continuation of U.S. patent application Ser. No. 10/918,329, filed Aug. 13, 2004, now U.S. Pat. No. 7,613,945, which claims priority of U.S. Provisional Patent Application Ser. No. 60/495,204, filed Aug. 14, 2003, and is related to U.S. patent application Ser. No. 11/689,847, now U.S. Pat. No. 7,574,622, U.S. patent application Ser. No. 11/689,862, now U.S. Pat. No. 7,398,418, U.S. patent application Ser. No. 11/689,877, now U.S. Pat. No. 7,404,102, and U.S. patent application Ser. No. 11/689,899, now U.S. Pat. No. 7,493,514, each filed Mar. 22, 2007. The subject matter of each of the above-identified applications is hereby incorporated herein by reference in its entirety.

FIELD OF THE INVENTION

The present invention generally relates to a disk drive system and method, and more particularly to a disk drive system having capabilities such as dynamic data allocation and disk drive virtualization, etc.

BACKGROUND OF THE INVENTION

The existing disk drive systems have been designed in such a way that a virtual volume data storage space is statically associated with physical disks with specific size and location for storing data. These disk drive systems need to know and monitor/control the exact location and size of the virtual volume of data storage space in order to store data. In addition, the systems often need bigger data storage space whereby more RAID devices are added. However, often times these additional RAID devices are expensive and not required until extra data storage space is actually needed.

FIG. 14A illustrates a prior existing disk drive system having a virtual volume data storage space associated with physical disks with specific size and location for storing, reading/writing, and/or recovering data. The disk drive system statically allocates data based on the specific location and size of the virtual volume of data storage space. As a result, emptied data storage space is not used, and extra and sometimes expensive data storage devices, e.g. RAID devices, are acquired in advance for storing, reading/writing, and/or recovering data in the system. These extra data storage space may not be needed and/or used until later in time.

Therefore, there is a need for an improved disk drive system and method. There is a further need for an efficient, dynamic data allocation and disk drive space and time management system and method.

SUMMARY OF THE INVENTION

The present invention provides an improved disk drive system and method capable of dynamically allocating data. The disk drive system may include a RAID subsystem having a matrix of disk storage blocks and a disk manager having at least one disk storage system controller. The RAID subsystem and disk manager dynamically allocate data across the matrix of disk storage blocks and a plurality of disk drives based on RAID-to-disk mapping. The RAID subsystem and disk manager determine whether additional disk drives are required, and a notification is sent if the additional disk drives are required. Dynamic data allocation allows a user to acquire a disk drive later in time when it is needed. Dynamic data allocation also allows efficient data storage of snapshots/point-in-time copies of virtual volume matrix or pool of disk storage blocks, instant data replay and data instant fusion for data backup, recovery etc., remote data storage, and data progression, etc. Data progression also allows deferral of a cheaper disk drive since it is purchased later in time.

In one embodiment, a matrix or pool of virtual volumes or disk storage blocks is provided to associate with physical disks. The matrix or pool of virtual volumes or disk storage blocks is monitored/controlled dynamically by the plurality of disk storage system controllers: In one embodiment, the size of each virtual volume can be default or predefined by a user, and the location of each virtual volume is default as null. The virtual volume is null until data is allocated. The data can be allocated in any grid of the matrix or pool (e.g. a "dot" in the grid once data is allocated in the grid). Once the data is deleted, the virtual volume is again available as indicated to be "null". Thus, extra data storage space and sometimes expensive data storage devices, e.g. RAID devices, can be acquired later in time on a need basis.

In one embodiment, a disk manager may manage a plurality of disk storage system controllers, and a plurality of redundant disk storage system controllers can be implemented to cover the failure of an operated disk storage system controller.

In one embodiment, a RAID subsystem includes a combination of at least one of RAID types, such as RAID-0, RAID-1, RAID-5, and RAID-10. It will be appreciated that other RAID types can be used in alternative RAID subsystems, such as RAID-3, RAID-4, RAID-6, and RAID-7, etc.

The present invention also provides a dynamic data allocation method which includes the steps of: providing a default size of a logical block or disk storage block such that disk space of a RAID subsystem forms a matrix of disk storage blocks; writing data and allocating the data in the matrix of the disk storage blocks; determining occupancy rate of the disk space of the RAID subsystem based on historical occupancy rate of the disk space of the RAID subsystem; determining whether additional disk drives are required; and sending a notification to the RAID subsystem if the additional disk drives are required. In one embodiment, the notification is sent via an email.

One of the advantages of the disk drive system of the present invention is that the RAID subsystem is capable of employing RAID techniques across a virtual number of disks. The remaining storage space is freely available. Through monitoring storage, space and determining occupancy rate of the storage space of the RAID subsystem, a user does not have to acquire a large sum of drives that are expensive but has no use at the time of purchase. Thus, adding drives when they are actually needed to satisfy the increasing demand of the storage space would significantly reduce the overall cost of the disk drives. Meanwhile, the efficiency of the use of the drives is substantially improved.

Another advantage of the present invention is that the disk storage system controller is universal to any computer file system, not just to a specific computer file system.

The present invention also provides a method of data instant replay. In one embodiment, the data instant replay method includes the steps of: providing a default size of a logical block or disk storage block such that disk space of a RAID subsystem forms a page pool of storage or a matrix of disk storage blocks; automatically generating a snapshot of volumes of the page pool of storage or a snapshot of the matrix of disk storage blocks at predetermined time intervals; and storing an address index of the snapshot or delta in the page pool of storage or the matrix of the disk storage blocks such that the snapshot or delta of the matrix of the disk storage blocks can be instantly located via the stored address index.

The data instant replay method automatically generates snapshots of the RAID subsystem at user defined time intervals, user configured dynamic time stamps, for example, every few minutes or hours, etc., or time directed by the server. In case of a system failure or virus attack, these time-stamped virtual snapshots allow data instant replay and data instant recovery in a matter of a few minutes or hours, etc. The technique is also referred to as instant replay fusion, i.e. the data shortly before the crash or attack is fused in time, and the snapshots stored before the crash or attack can be instantly used for future operation.

In one embodiment, the snapshots can be stored at a local RAID subsystem or at a remote RAID subsystem so that if a major system crash occurs due to, for example a terrorist attack, the integrity of the data is not affected, and the data can be instantly recovered.

Another advantage of the data instant replay method is that the snapshots can be used for testing while the system remains its operation. Live data can be used for real-time testing.

The present invention also provides a method of data instant replay and data instant fusion. FIGS. 3A and 3B illustrate schematic views of a snapshot of a disk storage block of a RAID subsystem at a plurality of time-intervals in accordance with the principles of the present invention. FIG. 3C illustrates a data instant replay method 300 which includes a step 302 of defining a default size of a logical block or disk storage block such that disk space of a RAID subsystem forms a page pool of storage or a matrix of disk storage blocks; a step 304 of automatically generating a snapshot of volumes of the page pool or a snapshot of the matrix of disk storage blocks at predetermined time intervals; and a step 306 and storing an address index of the snapshot or delta in the page pool of storage or the matrix of the disk storage blocks such that the snapshot or delta of the matrix of the disk storage blocks can be instantly located via the stored address index.

In one embodiment, the disk storage system controller monitors frequency of data use from the snapshots of the matrix of the disk storage blocks and applies an aging rule such that the less frequently used or accessed data is moved to the less expensive RAID subsystem. Similarly, when the data in the less expensive RAID subsystem starts to be used more frequently, the controller moves the data to the more expensive RAID subsystem. Accordingly, a user is able to choose a desired RAID subsystem portfolio to meet its own storage needs. Therefore, the cost of the disk drive system can be significantly reduced and dynamically controlled by a user.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIGS. 3A and 3B are schematic views of a snapshot of a disk storage block of a RAID subsystem at a plurality of time-intervals in accordance with the principles of the present invention.

FIG. 14A illustrates one embodiment of a disk drive system having a virtual volume matrix of disk storage blocks for dynamically allocating data in the system in accordance with the principles of the present invention.

FIG. 14B illustrates one embodiment of dynamic data allocation in the virtual volume matrix of disk storage blocks as shown in FIG. 14A.

FIG. 14C illustrates a schematic view of a volume-RAID page remapping of one embodiment of the virtual volume page pool of storage in accordance with the principles of the present invention.

FIG. 15 illustrates an example of three disk drives mapped to a plurality of disk storage blocks of a RAID subsystem in accordance with the principles of the present invention.

FIG. 16 illustrates an example of remapping of the disk drive storage blocks after adding a disk drive to three disk drives as shown in FIG. 15.

FIG. 17 illustrates one embodiment of accessible data pages in a data progression operation in accordance with the principles of the present invention.

DETAILED DESCRIPTION OF THE PREFERRED EMBODIMENTS

The present invention provides an improved disk drive system and method capable of dynamically allocating data. The disk drive system may include a RAID subsystem having a page pool of storage that maintains a free list of RAIDs or alternatively, a matrix of disk storage blocks, and a disk manager having at least one disk storage system controller. The RAID subsystem and disk manager dynamically allocate data across the page pool of storage or the matrix of disk storage blocks and a plurality of disk drives based on RAID-to-disk mapping. The RAID subsystem and disk manager determine whether additional disk drives are required, and a notification is sent if the additional disk drives are required. Dynamic data allocation allows a user to acquire a disk drive later in time when it is needed. Dynamic data allocation also allows efficient data storage of snapshots/point-in-time copies of virtual volume matrix or pool of disk storage blocks, instant data replay and data instant fusion for data backup, recovery etc., remote data storage, and data progression, etc. Data progression also allows deferral of a cheaper disk drive since it is purchased later in time.

Figure 1:
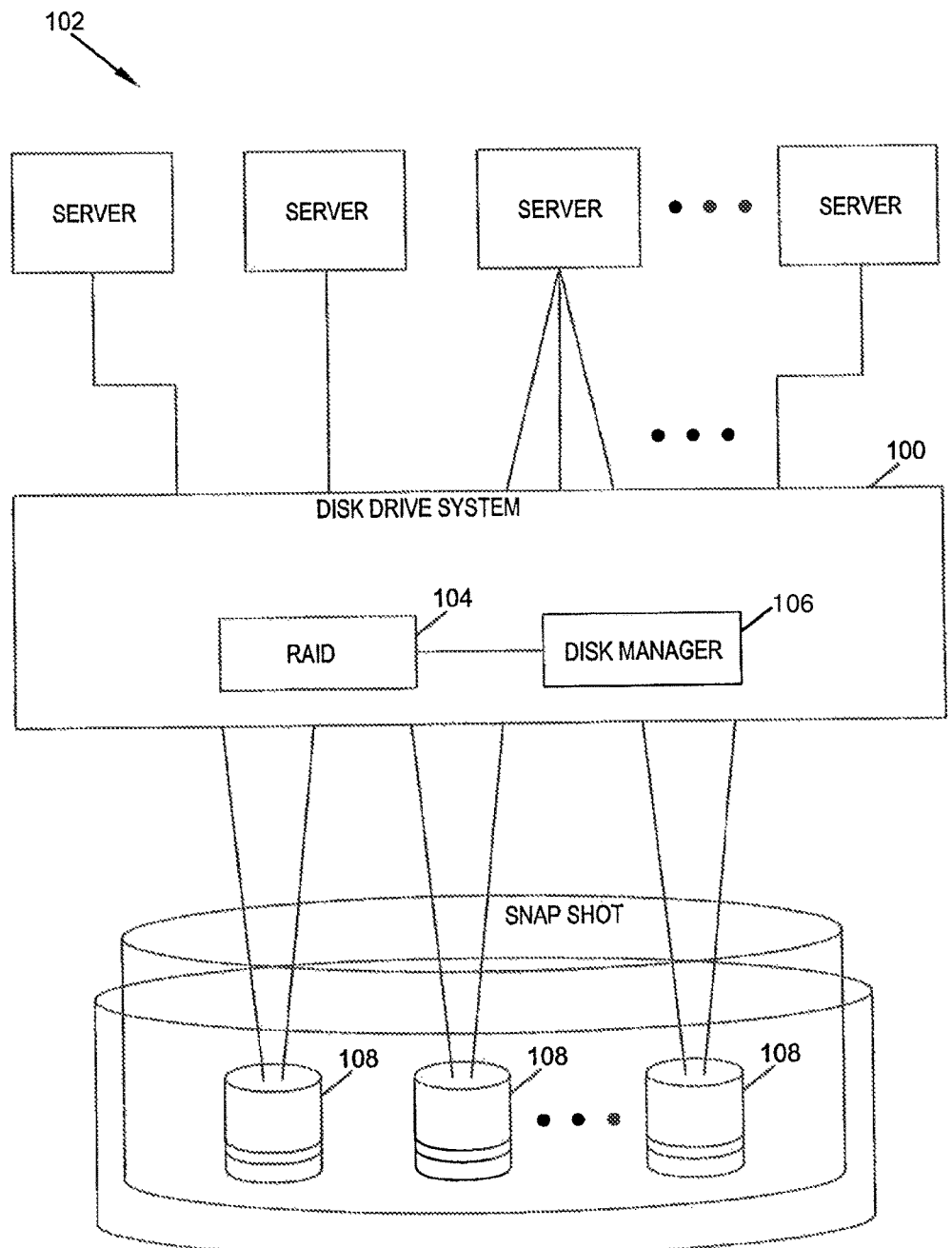
FIG. 1 illustrates one embodiment of a disk drive system in a computer environment in accordance with the principles of the present invention.

FIG. 1 illustrates one embodiment of a disk drive system 100 in a computer environment 102 in accordance with the principles of the present invention. As shown in FIG. 1, the disk drive system 100 includes a RAID subsystem 104 and a disk manager 106 having at least one disk storage system controller (FIG. 16). The RAID subsystem 104 and disk manager 106 dynamically allocate data across disk space of a plurality of disk drives 108 based on RAID-to-disk mapping. In addition, the RAID subsystem 104 and disk manager 106 are capable of determining whether additional disk drives are required based on the data allocation across disk space. If the additional disk drives are required, a notification is sent to a user so that additional disk space may be added if desired.

Figure 2:
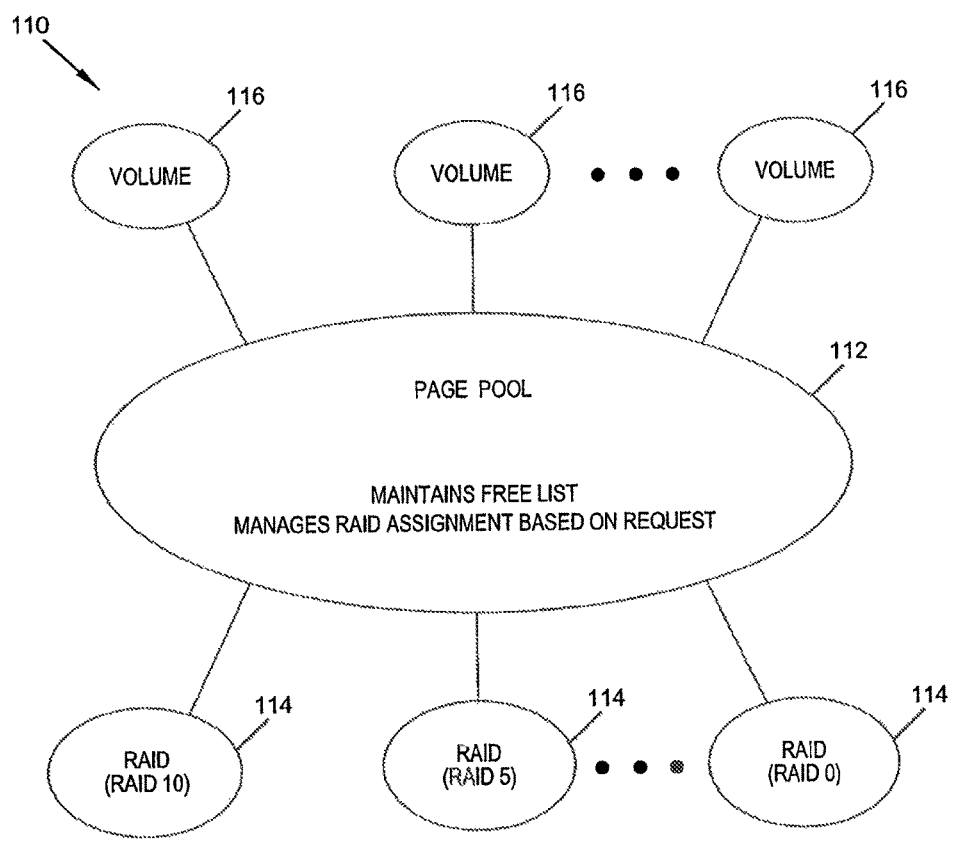
FIG. 2 illustrates one embodiment of a dynamic data allocation having a page pool of storage for a RAID subsystem of a disk drive in accordance with the principles of the present invention.

The disk drive system 100 having a dynamic data allocation (or referred to "disk drive virtualization") in accordance with the principles of the present invention is illustrated in FIG. 2 in one embodiment and FIGS. 14A and 14B in another embodiment. As shown in FIG. 2, a disk storage system 110 includes a page pool of storage 112, i.e. a pool of data storage including a list of data storage space that is free to store data. The page pool 112 maintains a free list of RAID devices 114 and manages read/write assignments based on user's requests. User's requested data storage volumes 116 are sent to the page pool 112 to get storage space. Each volume can request same or different classes of storage devices with same or different RAID levels, e.g. RAID 10, RAID 5, RAID 0, etc.

Another embodiment of dynamic data allocation of the present invention is shown in FIGS. 14A and 14B, where a disk storage system 1400 having a plurality of disk storage system controllers 1402 and a matrix of disk storage blocks 1404 controlled by the plurality of disk storage system controllers 1402 dynamically allocates data in the system in accordance with the principles of the present invention. The matrix of virtual volumes or blocks 1404 is provided to associate with physical disks. The matrix of virtual volumes or blocks 1404 is monitored/controlled dynamically by the plurality of disk storage system controllers 1402. In one embodiment, the size of each virtual volume 1404 can be predefined, for example 2 Megabytes, and the location of each virtual volume 1404 is default as null. Each of the virtual volumes 1404 is null until data is allocated. The data can be allocated in any grid of the matrix or pool (e.g. a "dot" in the grid once data is allocated in the grid). Once the data is deleted, the virtual volume 1404 is again available as indicated to be "null". Thus, extra and sometimes expensive data storage devices, e.g. RAID devices, can be acquired later in time on a need basis.

Accordingly, the RAID subsystem is capable of employing RAID techniques across a virtual number of disks. The remaining storage space is freely available. Through monitoring storage space and determining occupancy rate of the storage space of the RAID subsystem, a user does not have to acquire a large sum of drives that are expensive but has no use at the time of purchase. Thus, adding drives when they are actually needed to satisfy the increasing demand of the storage space would significantly reduce the overall cost of the disk drives. Meanwhile, the efficiency of the use of the drives is substantially improved.

Also, dynamic data allocation of the disk drive system of the present invention allows efficient data storage of snapshots/point-in-time copies of virtual volume page pool of storage or virtual volume matrix of disk storage blocks, instant data replay and data instant fusion for data recovery and remote data storage, and data progression.

The above features and advantages resulted from a dynamic data allocation system and method and the implementation thereof in the disk drive system 100 are discussed below in details:

Dynamic Data Allocation

Figure 2B:
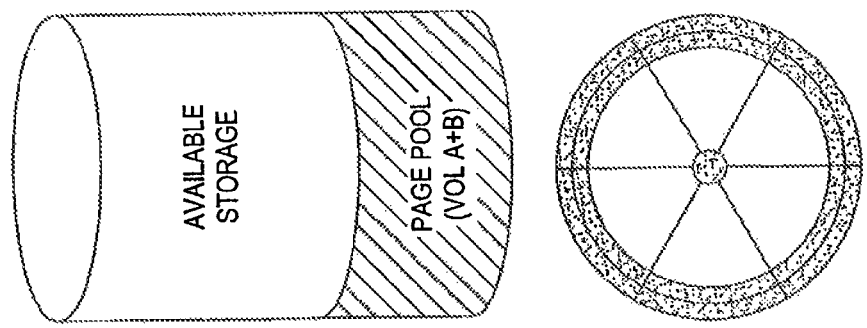
FIG. 2B illustrates a data allocation in a RAID subsystem of a disk drive system in accordance with the principles of the present invention.
Figure 2A:
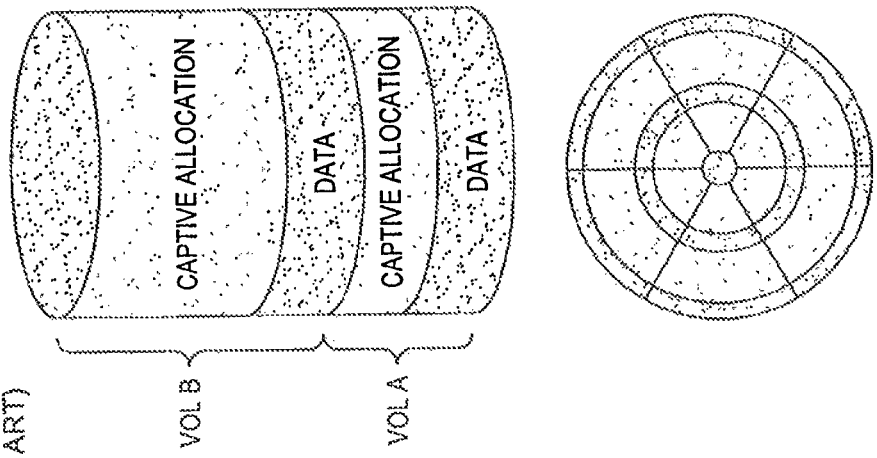
FIG. 2A illustrates a conventional data allocation in a RAID subsystem of a disk drive system.

FIG. 2A illustrates a conventional data allocation in a RAID subsystem of a disk drive system, whereby emptied data storage space is captive and not capable of being allocated for data storage.

FIG. 2B illustrates a data allocation in a RAID subsystem of a disk drive system in accordance with the principles of the present invention, whereby emptied data storage that is available for data storage is mixed together to form a page pool, e.g. a single page pool in one embodiment of the present invention.

Figure 2C:
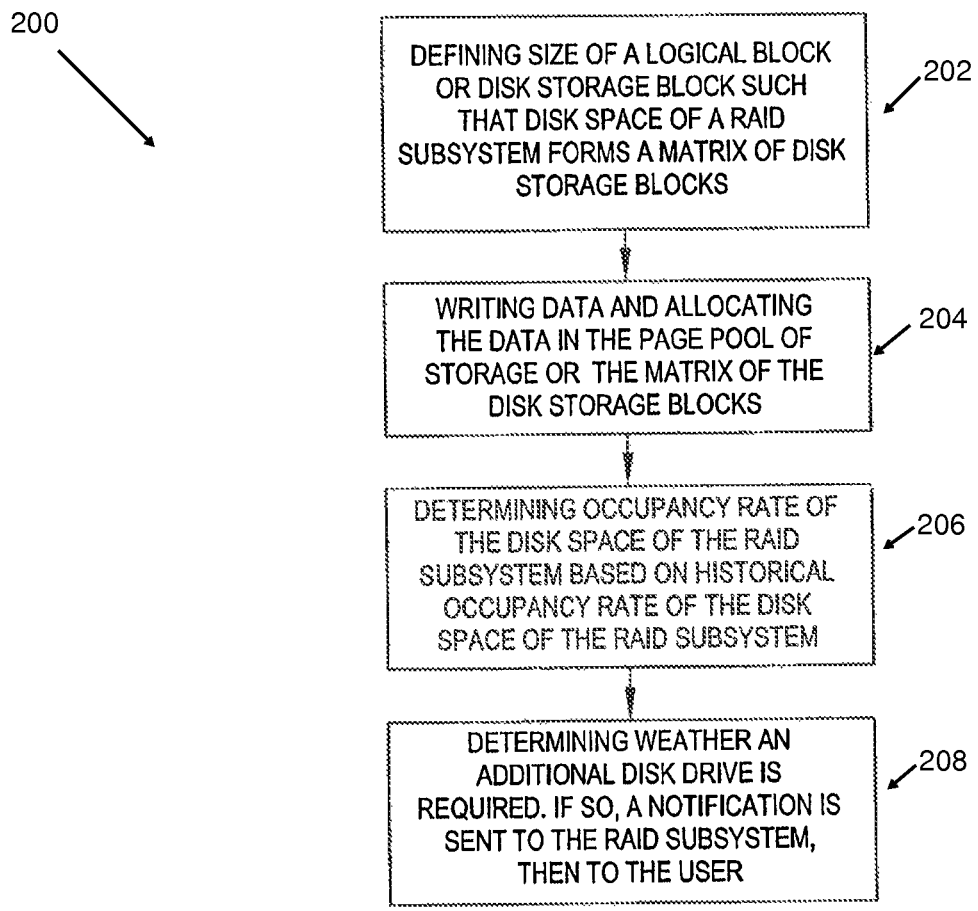
FIG. 2C illustrates a dynamic data allocation method in accordance with the principles of the present invention.

FIG. 2C illustrates a dynamic data allocation method 200 in accordance with the principles of the present invention. The dynamic data allocation method 200 includes a step 202 of defining a default size of a logical block or disk storage block such that disk space of a RAID subsystem forms a matrix of disk storage blocks; and a step 204 of writing data and allocating the data in a disk storage block of the matrix where the disk storage block indicates "null". The method further includes a step 206 of determining occupancy rate of the disk space of the RAID subsystem based on historical occupancy rate of the disk space of the RAID subsystem; and a step 208 of determining whether additional disk drives are required and if so, sending a notification to the RAID subsystem. In one embodiment, the notification is sent via an email. Further, the size of the disk storage block can be set as a default and changeable by a user.

In one embodiment, dynamic data allocation, sometimes referred to as "virtualization" or "disk space virtualization", efficiently handles a large number of read and write requests per second. The architecture may require the interrupt handlers to call a cache subsystem directly. Dynamic data allocation may not optimize requests as it does not queue them, but it may have a large number of pending requests at a time.

Dynamic data allocation may also maintain data integrity and protect the contents of the data for any controller failure. To do so, dynamic data allocation writes state information to RAID device for reliable storage.

Dynamic data allocation may further maintain the order of read and write requests and complete read or write requests in the exact order that the requests were received. Dynamic data allocation provides for maximum system availability and supports remote replication of data to a different geographical location.

In addition, dynamic data allocation provides recovery capabilities from data corruption. Through snapshot, a user may view the state of a disk in the past.

Dynamic data allocation manages RAID devices and provides a storage abstraction to create and expand large devices.

Dynamic data allocation presents a virtual disk device to the servers; the device is called a volume. To the server, the volume acts the same. It may return different information for serial number, but the volumes behave essentially like a disk drive. A volume provides a storage abstraction of multiple RAID devices to create a larger dynamic volume device. A volume includes multiple RAID devices, allowing for the efficient use of disk space.

Figure 21:
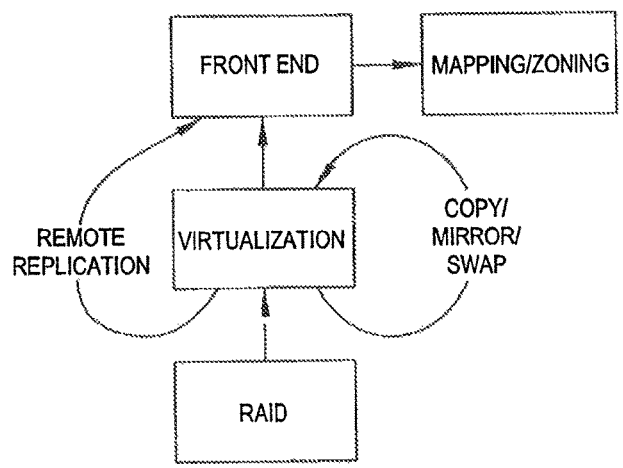
FIG. 21 illustrates one embodiment of external data flow in the subsystem in accordance with the principles of the present invention.

FIG. 21 illustrates a prior existing volume logical block mapping. FIG. 14C shows a volume-RAID page remapping of one embodiment of the virtual volume page pool of storage in accordance with the principles of the present invention. Each volume is broken into a set of pages, e.g. 1, 2, 3, etc., and each RAID is broken into a set of pages. The volume page size and the RAID page size can be the same in one embodiment. Accordingly, one example of the volume-RAID page remapping of the present invention is that page #1 using a RAID-2 is mapped to RAID page #1.

Dynamic data allocation maintains data integrity of the volumes. Data is written to the volumes and confirmed to the server. Data integrity covers various controller configurations including stand alone and redundant through a controller failure. Controller failure includes power failure, power cycle, software exception, and hard reset. Dynamic data allocation generally does not handle disk drive failures which are covered by RAID.

Dynamic data allocation provides the highest levels of data abstraction for the controller. It accepts requests from the front end and ultimately uses RAID devices to write the data to disks.

Dynamic data allocation includes a number of internal subsystems:
Cache—Smoothes read and write operations to a volume by providing rapid response time to the server, and bundling writes to data plug-in.
Configuration—Contains the methods to create, delete, retrieve, and modify data allocation objects. Provides components to create a toolbox for higher level system applications.
Data Plug-In—Distributes volume read and write requests to various subsystems depending on volume configuration.
RAID Interface—Provides RAID device abstraction to create larger volumes to the user and other dynamic data allocation subsystems.
Copy/Mirror/Swap—Replicates volume data to local and remote volumes. In one embodiment, it may only copy the blocks written by the server.
Snapshot—Provides incremental volume recovery of data. It instantly creates View Volumes of past volume states.
Proxy Volume—Implements request communication to a remote destination volume to support the Remote Replication.
Billing—Ability to charge users for allocated storage, activity, performance, and recovery of data.
Dynamic data allocation also logs any errors and significant changes in configuration.

FIG. 21 illustrates one embodiment of external data flow in the subsystem. External requests come from Front End. Requests include get volume information, read and write. All requests have the volume ID. Volume information is handled by the volume configuration subsystem. Read and write requests include the LBA. Write requests also include the data.

Depending on volume configuration, dynamic data allocation passes a request to a number of external layers. Remote replication passes requests to the front end, destined for a remote destination volume. The RAID Interface passes requests to RAID. Copy/mirror/swap passes requests back to dynamic data allocation to a destination volume.

Figure 22:
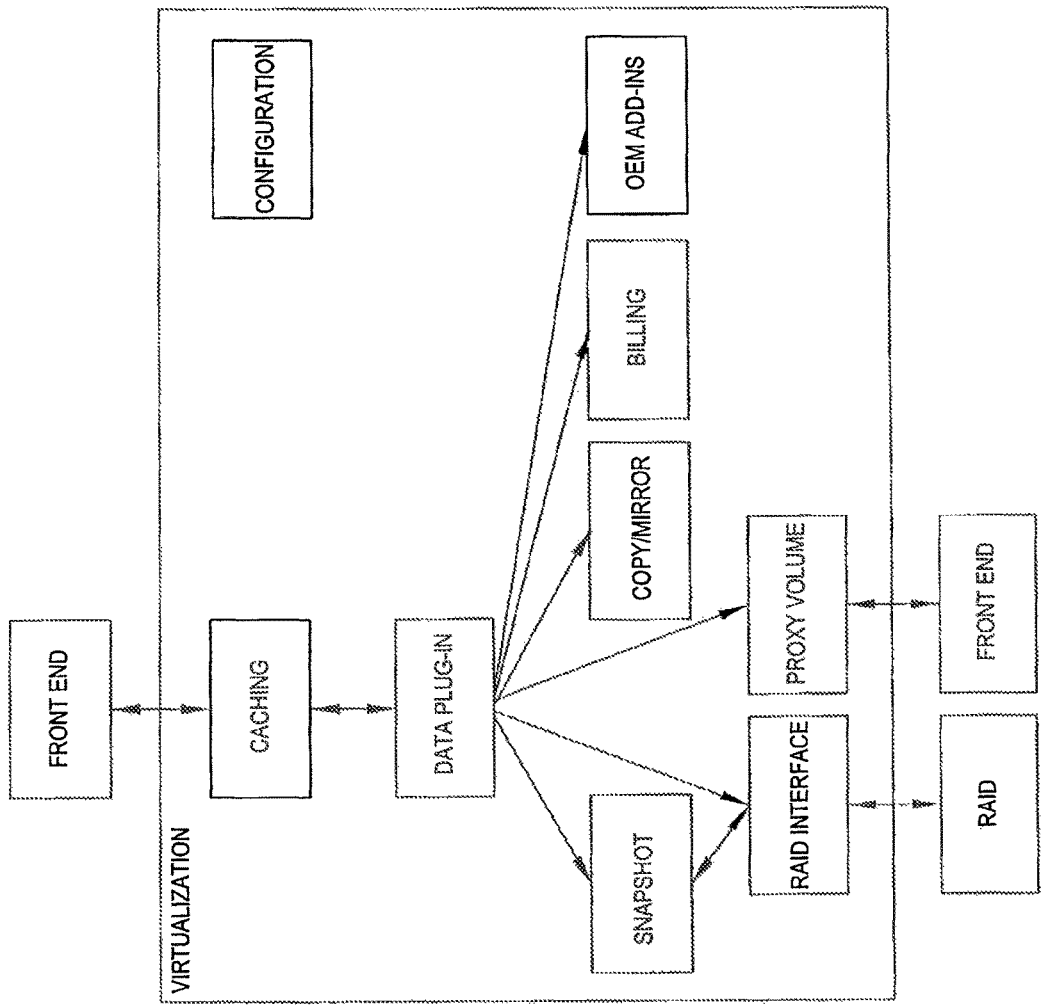
FIG. 22 illustrates one embodiment of internal data flow in the subsystem.

FIG. 22 illustrates one embodiment of internal data flow in the subsystem. The internal data flow starts with caching. Caching may place write requests into the cache or pass the requests directly to data plug-in. The cache supports direct DMA from front end HBA devices. Requests may be completed quickly and responses returned to the server. The data plug-in manager is the center of request flow below the cache. For each volume, it calls registered subsystem objects for each request.

Figure 23:
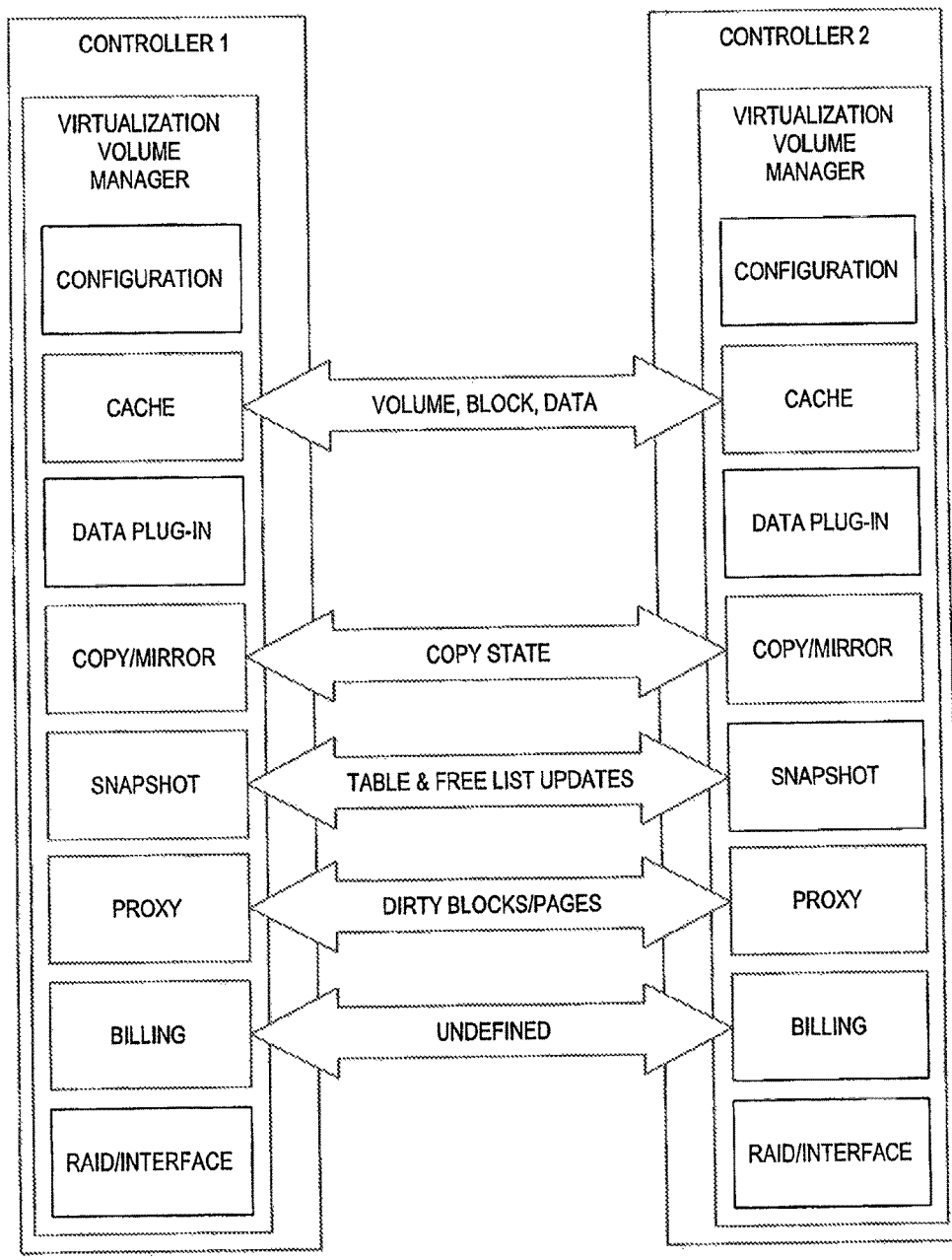
FIG. 23 illustrates one embodiment of each subsystem independently maintaining coherency.

Dynamic data allocation subsystems that affect data integrity may require support for controller coherency. As shown in FIG. 23, each subsystem independently maintains coherency. Coherency updates avoid copying data blocks across the coherency link. Cache coherency may require copying data to the peer controller.

Disk Storage System Controller

FIG. 14A illustrates a disk storage system 1400 having a plurality of disk storage system controllers 1402 and a matrix of disk storage blocks or virtual volumes 1404 controlled by the plurality of disk storage system controllers 1402 for dynamically allocating data in the system in accordance with the principles of the present invention. FIG. 14B illustrates one embodiment of dynamic data allocation in the virtual volume matrix of disk storage blocks or virtual volumes 1404.

In one operation, the disk storage system 1400 automatically generates a snapshot of the matrix of disk storage blocks or virtual volumes 1404 at predetermined time intervals and stores an address index of the snapshot or delta in the matrix of the disk storage blocks or virtual volumes 1404 such that the snapshot or delta of the matrix of the disk storage blocks or virtual volumes 1404 can be instantly located via the stored address index.

Further in one operation, the disk storage system controller 1402 monitors frequency of data use from the snapshots of the matrix of the disk storage blocks 1404 and applies an aging rule such that the less frequently used or accessed data is moved to the less expensive RAID subsystem. Similarly, when the data in the less expensive RAID subsystem starts to be used more frequently, the controller moves the data to the more expensive RAID subsystem. Accordingly, a user is able to choose a desired RAID subsystem portfolio to meet its own storage needs. Therefore, the cost of the disk drive system can be significantly reduced and dynamically controlled by a user.

RAID-to-Disk Mapping

A RAID subsystem and disk manager dynamically allocate data across disk space of a plurality of disk drives based on RAID-to-disk mapping. In one embodiment, the RAID subsystem and disk manager determine whether additional disk drives are required, and a notification is sent if the additional disk drive is required.

FIG. 15 illustrates an example of three disk drives 108 (FIG. 1) mapped to a plurality of disk storage blocks 1502-1512 in a RAID-5 subsystem 1500 in accordance with the principles of the present invention.

FIG. 16 illustrates an example of remapping 1600 of the disk drive storage blocks after adding a disk drive 1602 to three disk drives 108 as shown in FIG. 15.

Disk Manager

The disk manager 106, as shown in FIG. 1, generally manages disks and disk arrays, including grouping/resource pooling, abstraction of disk attributes, formatting, addition/subtraction of disks, and tracking of disk service times and error rates. The disk manager 106 does not distinguish the differences between various models of disks and presents a generic storage device for the RAID component. The disk manager 106 also provides grouping capabilities which facilitate the construction of RAID groups with specific characteristics such as 10,000 RPM disks, etc.

In one embodiment of the present invention, the disk manager 106 is at least three-fold: abstraction, configuration, and I/O optimization. The disk manager 106 presents "disks" to upper layers which could be, for example, locally or remotely attached physical disk drives, or remotely attached disk systems.

The common underlying characteristic is that any of these devices could be the target of I/O operations. The abstraction service provides a uniform data path interface for the upper layers, particularly the RAID subsystem, and provides a generic mechanism for the administrator to manage target devices.

The disk manager 106 of the present invention also provides disk grouping capabilities to simplify administration and configuration. Disks can be named, and placed into groups, which can also be named. Grouping is a powerful feature which simplifies tasks such as migrating volumes from one group of disks to another, dedicating a group of disks to a particular function, specifying a group of disks as spares, etc.

The disk manager also interfaces with devices, such as a SCSI device subsystem which is responsible for detecting the presence of external devices. The SCSI device subsystem is capable, at least for fiber channel/SCSI type devices, of determining a subset of devices which are block-type target devices. It is these devices which are managed and abstracted by the disk manager.

Further, the disk manager is responsible for responding to flow control from a SCSI device layer. The disk manager has queuing capabilities, which presents the opportunity to aggregate I/O requests as a method to optimize the throughput of the disk drive system.

Furthermore, the disk manager of the present invention manages a plurality of disk storage system controllers. Also, a plurality of redundant disk storage system controllers can be implemented to cover the failure of an operated disk storage system controller. The redundant disk storage system controllers are also managed by the disk manager.

Disk Manager's Relationship to the Other Subsystems

The disk manager interacts with several other subsystems. The RAID subsystem is the major client of the services provided by the disk manager for data path activities. The RAID subsystem uses the disk manager as the exclusive path to disks for I/O. The RAID system also listens for events from the disk manager to determine the presence and operational status of disks. The RAID subsystem also works with the disk manager to allocate extents for the construction of RAID devices. Management control listens for disk events to learn the existence of disks and to learn of operational status changes. In one embodiment of the present invention, the RAID subsystem 104 may include a combination of at least one of RAID types, such as RAID-0, RAID-1, RAID-5, and RAID-10. It will be appreciated that other RAID types can be used in alternative RAID subsystems, such as RAID-4, RAID-6, and RAID-7, etc.

In one embodiment of the present invention, the disk manager utilizes the services of configuration access to store persistent configuration and present transient read-only information such as statistics to the presentations layers. The disk manager registers handlers with configuration access for access to these parameters.

The disk manager also utilizes the services of the SCSI device layer to learn of the existence and operational status of block devices, and has an I/O path to these block devices. The disk manager queries the SCSI device subsystem about devices as a supporting method to uniquely identify disks.

Data Instant Replay and Data Instant Fusion

Figure 3C:
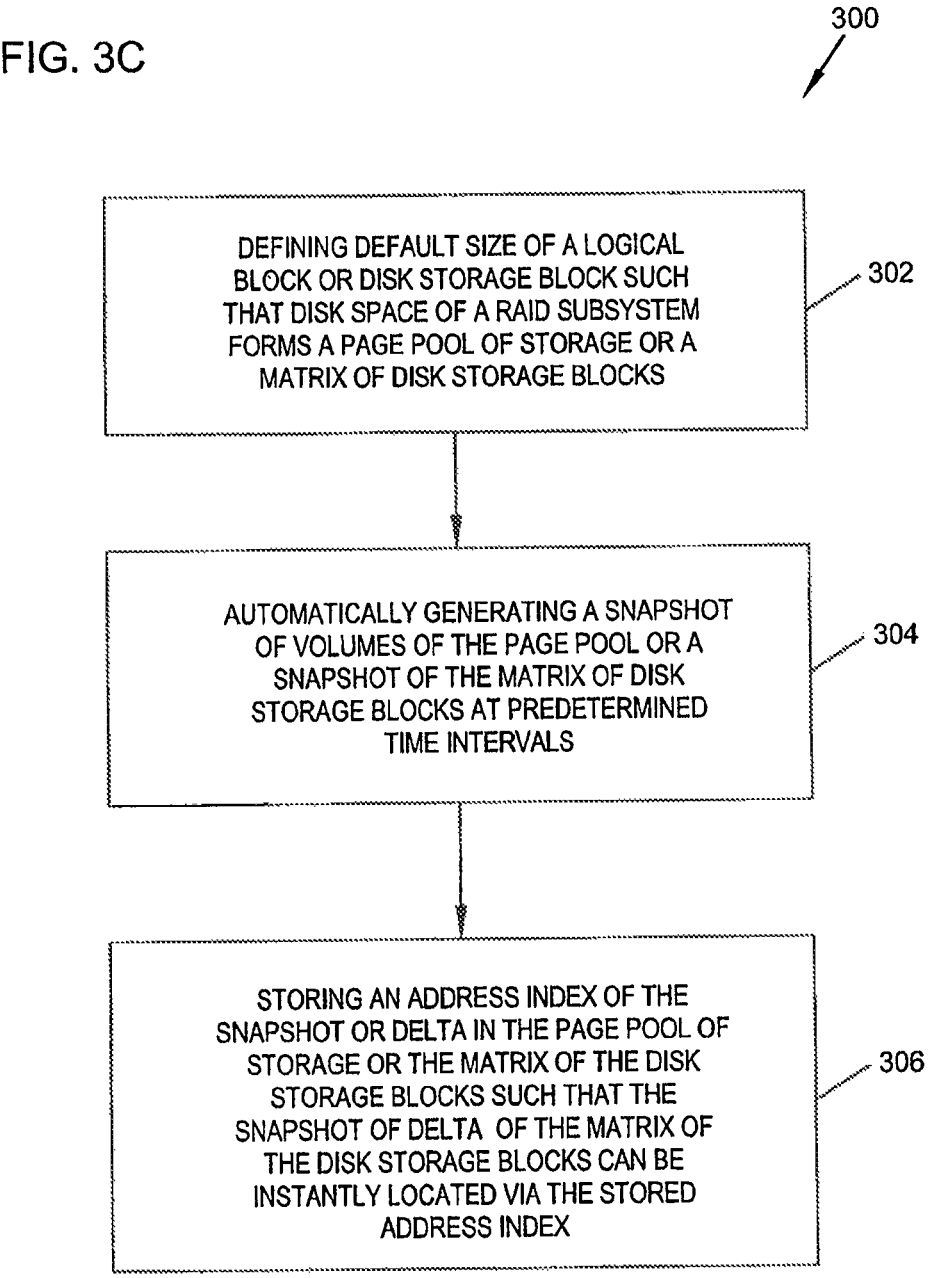
FIG. 3C illustrates a data instant replay method in accordance with the principles of the present invention.

The present invention also provides a method of data instant replay and data instant fusion. FIGS. 3A and 3B illustrate schematic views of a snapshot of a disk storage block of a RAID subsystem at a plurality of time-intervals in accordance with the principles of the present invention. FIG. 3C illustrates a data instant replay method 300 which includes a step 302 of defining a default size of a logical block or disk storage block such that disk space of a RAID subsystem forms a page pool of storage or a matrix of disk storage blocks; a step 304 of automatically generating a snapshot of volumes of the page pool or a snapshot of the matrix of disk storage blocks at predetermined time intervals; and storing an address index of the snapshot or delta in the page pool of storage or the matrix of the disk storage blocks such that the snapshot or delta of the matrix of the disk storage blocks can be instantly located via the stored address index.

As shown in FIG. 3B, at each predetermined time interval, e.g. 5 minutes, such as T1 (12:00 PM), T2 (12:05 PM), T3 (12:10 PM), and T4 (12:15 PM), a snapshot of the page pool of storage or the matrix of disk storage blocks are automatically generated. The address indexes of the snapshots or delta in the page pool of storage or the matrix of the disk storage blocks are stored in the page pool of storage or the matrix of the disk storage blocks such that the snapshot or delta of the page pool of storage or the matrix of the disk storage blocks can be instantly located via the stored address index.

Accordingly, the data instant replay method automatically generates snapshots of the RAID subsystem at a user defined time intervals, user configured dynamic time stamps, for example, every few minutes or hours, etc., or time directed by the server. In case of a system failure or virus attack, these time-stamped virtual snapshots allow data instant replay and data instant recovery in a matter of a few minutes or hours, etc. The technique is also referred to as instant replay fusion, i.e. the data shortly before the crash or attack is fused in time, and the snapshots stored before the crash or attack can be instantly used for future operation.

Figure 4:
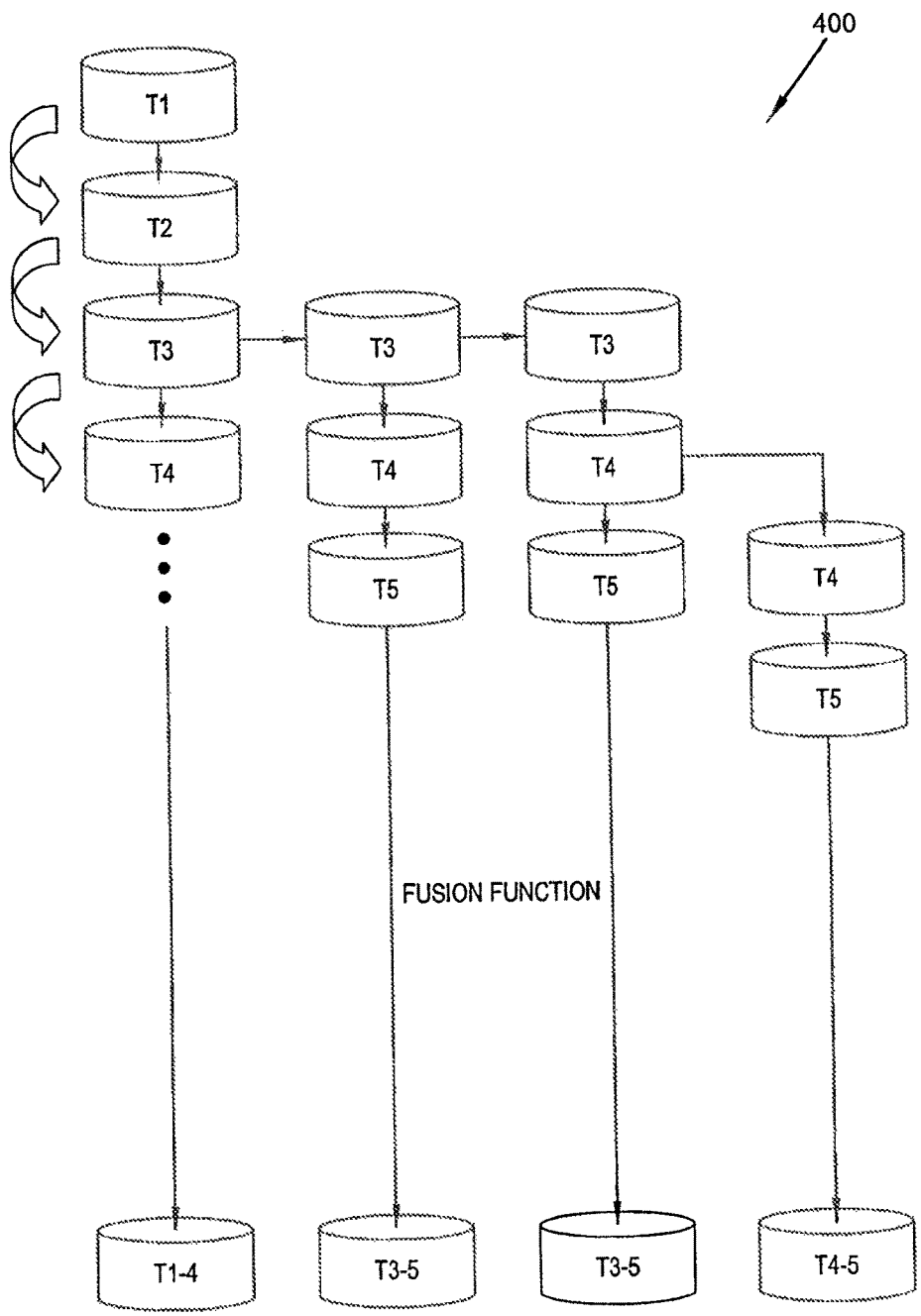
FIG. 4 is a schematic view of a data instant fusion function by using snapshots of disk storage blocks of a RAID subsystem in accordance with the principles of the present invention.

FIG. 4 further illustrates a schematic view of a data instant fusion function 400 by using multiple snapshots of disk storage blocks of a RAID subsystem in accordance with the principles of the present invention. At T3, a parallel chain T3'-T5' of snapshots are generated, whereby data that are fused and/or recovered by the fused data T3' can be used to replace the to-be-fused data at T4. Similarly, a plurality of parallel chains T3", T4'" of snapshots can be generated to replace the to-be-fused data at T4'-T5' and T4"-T5". In an alternative embodiment, the snapshots at T4, T4'-T5', T5" can still be stored in the page pool or the matrix.

Figure 5:
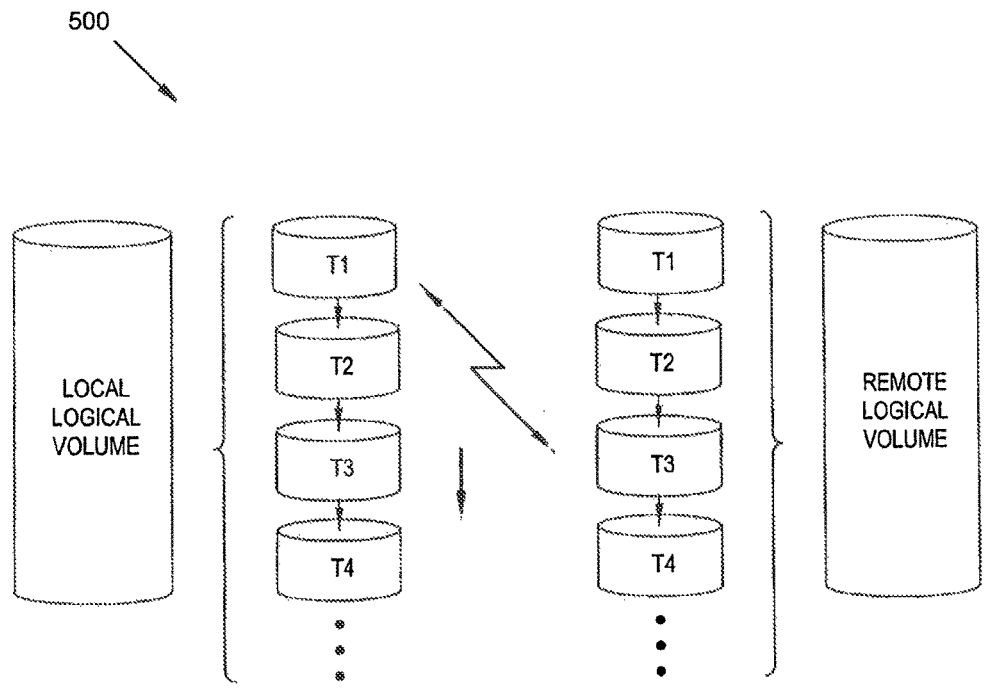
FIG. 5 is a schematic view of a local-remote data replication and instant replay function by using snapshots of disk storage blocks of a RAID subsystem in accordance with the principles of the present invention.
Figure 5:
Figure 5:
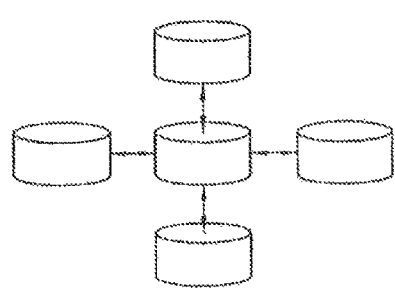
Figure 5:
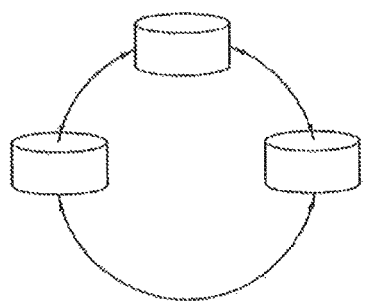

The snapshots can be stored at a local RAID subsystem or at a remote RAID subsystem so that if a major system crash occurs due to, for example a terrorist attack, the integrity of the data is not affected, and the data can be instantly recovered. FIG. 5 illustrates a schematic view of a local-remote data replication and instant replay function 500 by using snapshots of disk storage blocks of a RAID subsystem in accordance with the principles of the present invention.

Remote replication performs the service of replicating volume data to a remote system. It attempts to keep the local and remote volumes as closely synchronized as possible. In one embodiment, the data of the remote volume may not mirror a perfect copy of the data of the local volume. Network connectivity and performance may cause the remote volume to be out of synchronization with a local volume.

Another feature of the data instant replay and data instant fusion method is that the snapshots can be used for testing while the system remains its operation. Live data can be used for real-time testing.

Snapshot and Point-in-Time Copes (PITC)

An example of data instant replay is to utilize snapshots of disk storage blocks of a RAID subsystem in accordance with the principles of the present invention. Snapshot records write operations to a volume so that a view may be created to see the contents of a volume in the past. Snapshot thus also supports data recovery by creating views to a previous Point-in-Time Copy (PITC) of a volume.

The core of a snapshot implements create, coalesce, management, and I/O operations of the snapshot. Snapshot monitors writes to a volume and creates Point-in-Time Copies (PITC) for access through view volumes. It adds a Logical Block Address (LBA) remapping layer to a data path within the virtualization layer. This is another layer of virtual LBA mapping within the I/O path. The PITC may not copy all volume information, and it may merely modify a table that the remapping uses.

Snapshot tracks changes to volume data and provides the ability to view the volume data from a previous point-in-time. Snapshot performs this function by maintaining a list of delta writes for each PITC.

Snapshot provides multiple methods for PITC profiles including: application initiated, and time initiated. Snapshot provides the ability for the application to create PITC. The applications control the creation through the API on the server, which is delivered to the snapshot API. Also, snapshot provides the ability to create a time profile.

Snapshot may not implement a journaling system or recover all writes to a volume. Snapshot may only keep the last write to a single address within a PITC window. Snapshot allows a user to create PITC that covers a defined short period of time, such as minutes or hours, etc. To handle failures, snapshot writes all information to disk. Snapshot maintains volume data page pointers containing the delta writes. Since the tables provide the map to the volume data, and without it the volume data is inaccessible, the table information must handle controller failure cases.

View volume functions provide access to a PITC. View volume functions may attach to any PITC within the volume, except the active PITC. Attaching to a PITC is a relatively quick operation. Uses of view volume functions include testing, training, backup, and recovery. The view volume functions allow write operation and do not modify the underlying PITC it is based on.

In one embodiment, the snapshot is designed to optimize performance and ease use at the expense of disk space:
 Snapshot provides speedy response time for user requests. User requests include I/O, create a PITC, and create/delete a view volume. To achieve this snapshot uses more disk space to store table information than the minimum required. For I/O, snapshot summarizes the current state of a volume into a single table, so that all read and write requests may be satisfied by a single table. Snapshot reduces the impact on normal I/O operations as much as possible. Second, for view volume operations snapshot uses the same table mechanism as the main volume data path.

Snapshot minimizes the amount of data copied. To do this, snapshot maintains a table of pointers for each PITC. Snapshot copies and moves pointers, but it does not move the data on the volume.

Snapshot manages the volume using fixed-size data-pages. Tracking individual sectors may require massive amounts of memory for a single reasonable sized volume. By using a data page larger than a sector certain pages may contain a percentage of information directly duplicated from another page.

Snapshot uses the data space on the volume to store the data-page tables. The lookup tables are reproduced after a controller failure. The lookup tables allocate pages and sub-divide them.

Snapshot handles controller failure by requiring that a volume using snapshot operate on a single controller in one embodiment. This embodiment requires no coherency. All changes to the volume are recorded on disk or to reliable cache for recovery by a replacement controller. Recovery from a controller failure requires that the snapshot information be read from disk in one embodiment.

Snapshot uses the virtualization RAID interface to access the storage. Snapshot may use multiple RAID devices as a single data space.

Snapshot supports 'n' PITC per volume and 'm' views per volume. The limitation on 'n' and 'm' is a function of the disk space and memory of the controller.

Volume and Volume Allocation/Layout

Figure 6:
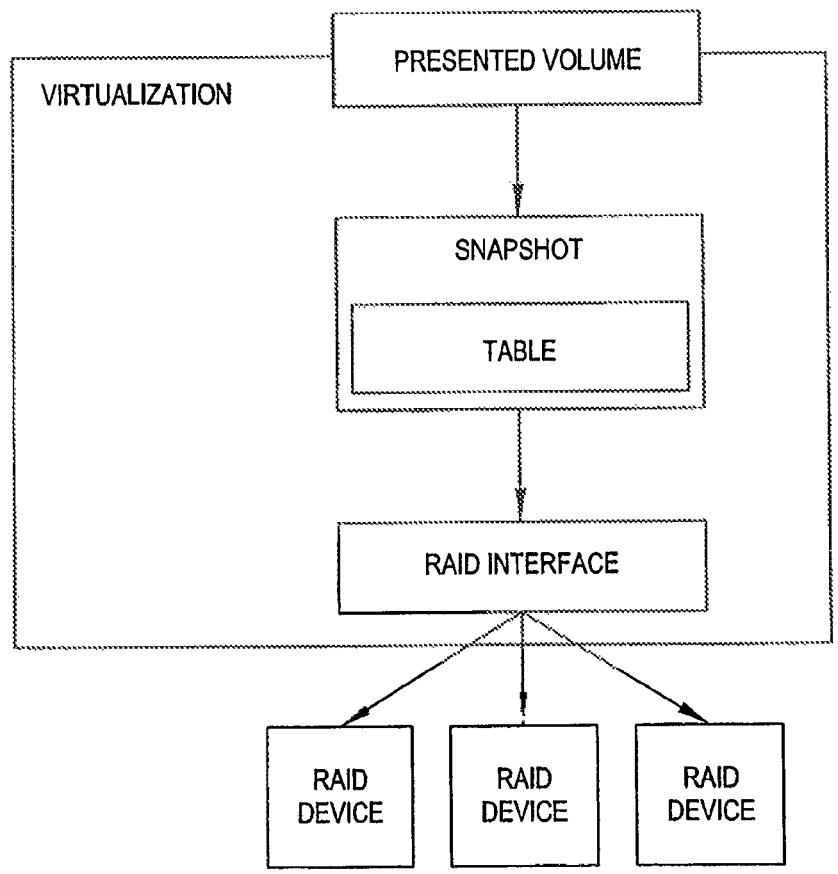
FIG. 6 illustrates a schematic view of a snapshot using the same RAID interface to perform I/O and concatenating multiple RAID devices into a volume in accordance with the principles of the present invention.

Snapshots add a LBA remapping layer to a volume. The remapping uses the I/O request LBA and the lookup table to convert the address to the data page. As shown in FIG. 6, a presented volume using snapshot behaves the same as a volume without snapshot. It has a linear LBA space and handles I/O requests. Snapshot uses the RAID interface to perform I/O and includes multiple RAID devices into a volume. In one embodiment, the size of the RAID devices for a snapshot volume is not the size of the presented volume. The RAID devices allow snapshot to expand the space for data pages within the volume.

A new volume, with snapshot enabled at the inception, only needs to include space for the new data pages. Snapshot does not create a list of pages to place in the bottom level PITC. The bottom level PITC is empty in this case. At allocation, all PITC pages are on the free list. By creating a volume with snapshot enabled at the inception, it may allocate less physical space than the volume presents. Snapshot tracks the writes to the volume. In one embodiment of the present invention, the NULL volume is not copied and/or stored in the page pool or matrix, thereby increasing the efficiency of the use of the storage space.

In one embodiment, for both allocation schemes, PITC places a virtual NULL volume at the bottom of the list. Reads to the NULL volume return blocks of zero. The NULL volume handles the sectors not previously written by the server. Writes to the NULL volume can not occur. The volume uses a NULL volume for reads to unwritten sectors.

The number of free pages depends on the size of the volume, the number of PITC, and the expected rate of data change. The system determines the number of pages to allocate for a given volume. The number of data pages may expand over time. Expansion may support a more rapid change in data than expected, more PITC, or a larger volume. New pages are added to the free list. The addition of pages to the free list may occur automatically.

Snapshot uses data pages to manage the volume space. Each data page may include megabytes of data. Using the operating system tends to write a number of sectors in the same area of a volume. Memory requirements also dictate that snapshot uses pages to manage volumes. Maintaining a single 32-bit pointer for each sector of a one-terabyte volume may require eight gigabytes of RAM. Different volumes may have different page size.

Figure 7:
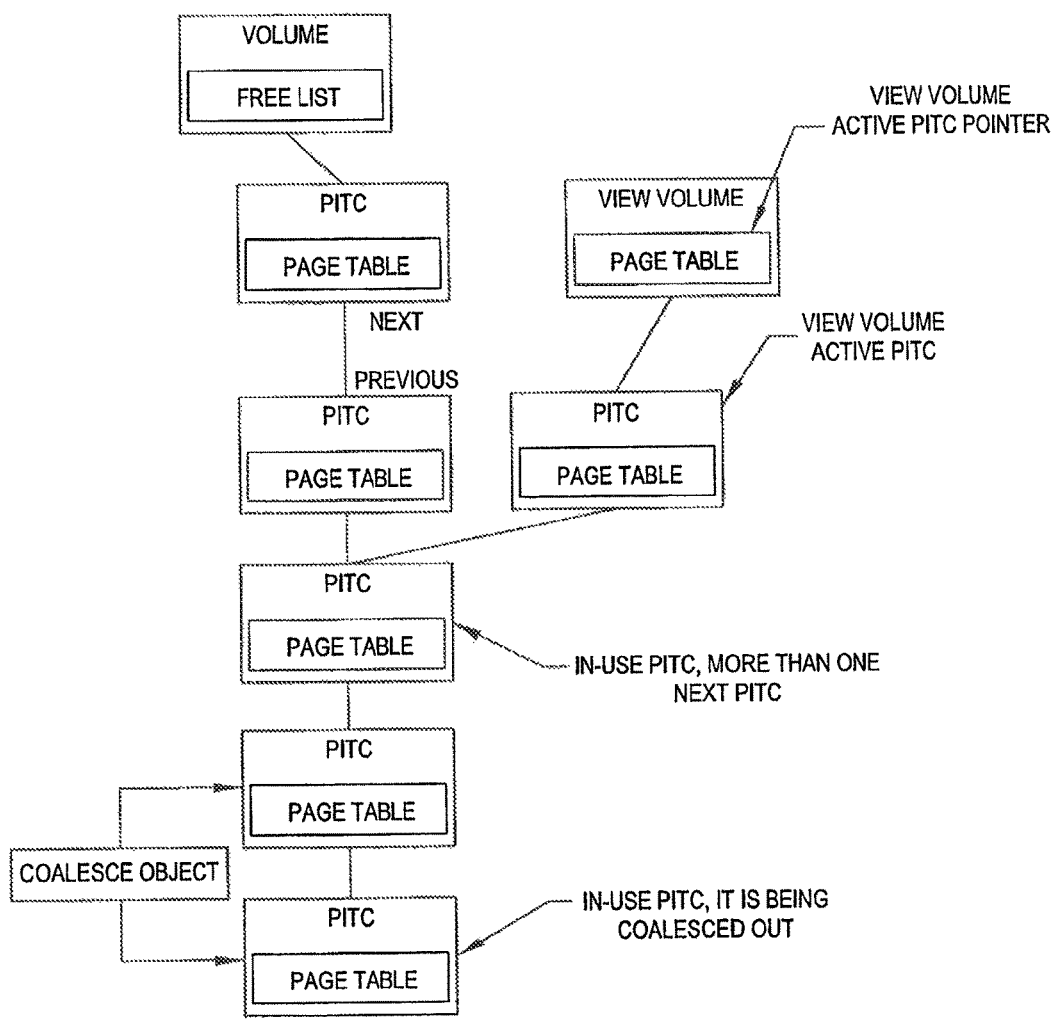
FIG. 7 illustrates one embodiment of a snapshot structure in accordance with the principles of the present invention.

FIG. 7 illustrates one embodiment of a snapshot structure. Snapshot adds a number of objects to the volume structure. Additional objects include the PITC, a pointer to the active PITC, the data page free list, child view volumes, and PITC coalesce objects.

Active PITC (AP) pointer is maintained by the volume. The AP handles the mapping of read and writes requests to the volume. The AP contains a summary of the current location of all the data within the volume.

The data pages free list tracks the available pages on the volume.

The optional child view volumes provide access to the volume PITC. The view volumes contain their own AP to record writes to the PITC, while not modifying the underlying data. A volume may support multiple child view volumes.

Snapshot coalesce objects temporarily link two PITC for the purpose of removing the previous PITC. Coalescing of PITC involves moving the ownership of data pages and freeing of data pages.

A PITC contains a table and data pages for the pages written while the PITC was active. The PITC contains a freeze time stamp at which point the PITC stopped accepting write requests. The PITC also contains a Time-to-Live value that determines at what time the PITC will coalesce.

Also, snapshot summarizes the data page pointers for the entire volume, at the time a PITC is taken to provide predictable read and write performance. Other solutions may require reads to examine multiple PITC to find the newest pointer. These solutions require table caching algorithm but has worst-case performance.

Snapshot summarizing in the present invention also reduces the worst-case memory usage of table. It may require that the entire table be loaded into memory, but it may require only a single table loaded.

The summary includes pages owned by the current PITC and may include pages from all previous PITC. To determine which pages the PITC may write, it tracks page ownership for each data page. It also tracks ownership for a coalesce process. To handle this, the data page pointer includes the page index.

Figure 8:
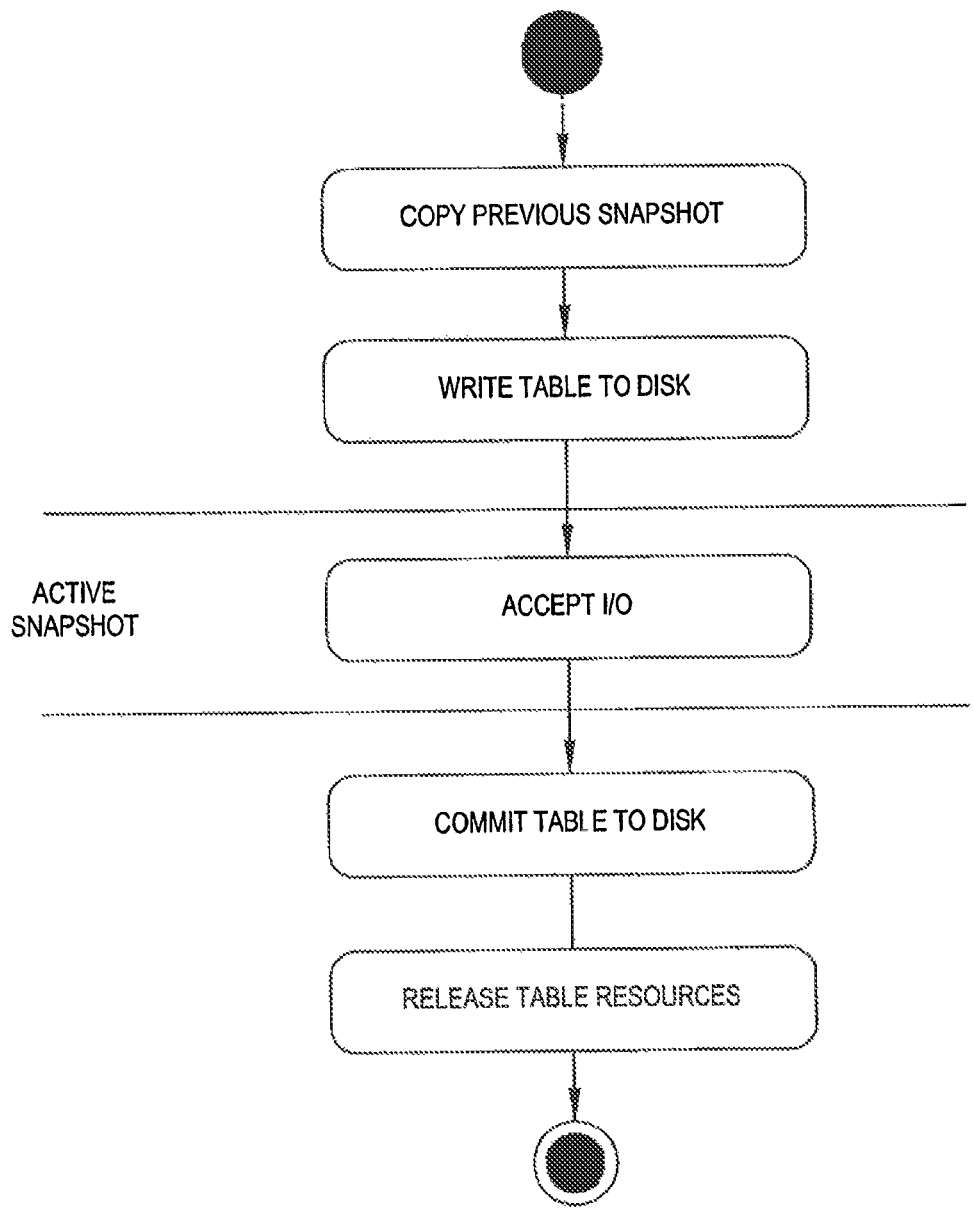
FIG. 8 illustrates one embodiment of a PITC life cycle in accordance with the principles of the present invention.

FIG. 8 illustrates one embodiment of a PITC life cycle. Each PITC goes through a number of following states before it is committed as read-only:

1. Create table—Upon creation, table is created.

2. Commit to disk—This generates the storage on the disk for the PITC. By writing the table at this point, it guarantees that the required space to store the table information is allocated before the PITC is taken. At the same time, the PITC object is also committed to the disk.

3. Accept I/O—It has become the active PITC (AP)—It now handles reads and writes requests for the volume. This is the only state that accepts writes requests to the table. The PITC generates an event that it is now active.

4. Commit the Table to Disk—The PITC is no longer the AP, and no longer accepts additional pages. A new AP has taken over. After this point, the table will not change unless it is removed during a coalesce operation. It is read-only. At this point, the PITC generates an event that it is frozen and committed. Any service may listen to the event.

5. Release table memory—Frees the memory that the table required. This step also clears the log to state that all changes are written to disk.

The top-level PITC for a volume or a view volume is called the active PITC (AP). The AP satisfies all read and write requests to the volume. The AP is the only PITC for the volume that may accept write requests. The AP contains a summary of data page pointers for the entire volume.

The AP may be the destination, not the source, for a coalesce process. Being the destination, the AP increases the number of owned pages, but it does not change the view of the data.

For volume expansion, the AP immediately grows with the volume. The new pages point to the NULL volume. Non-AP PITC does not require modification for volume expansion.

Figure 9:
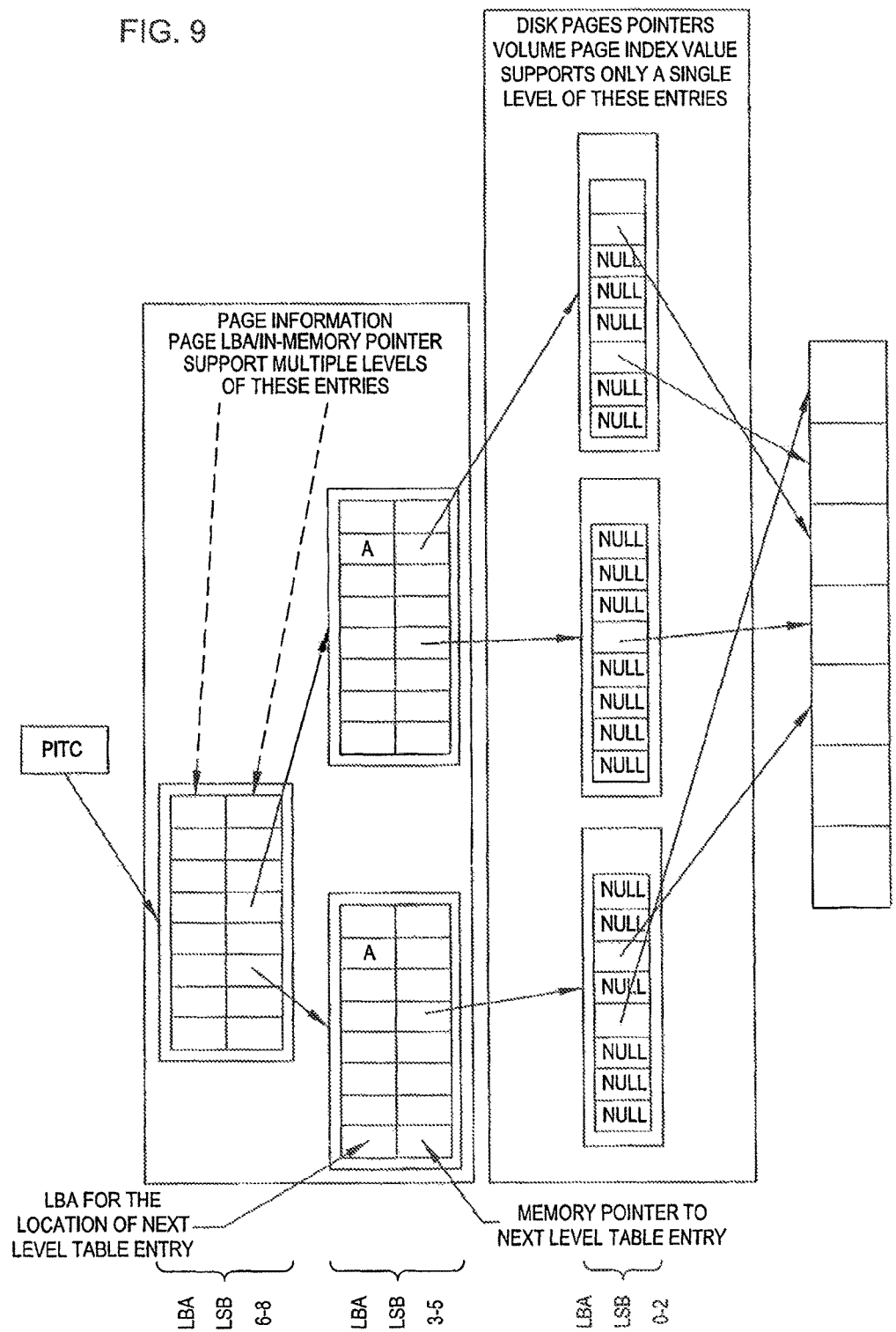
FIG. 9 illustrates one embodiment of a PITC table structure having a multi-level index in accordance with the principles of the present invention.

Each PITC maintains a table to map an incoming LBA to a data page pointer to the underlying volume. The table includes pointers to data pages. The table needs to address more physical disk space than presented logical space. FIG. 9 illustrates one embodiment of a table structure having a multi-level index. The structure decodes the volume LBA to a data-page pointer. Each level decodes increasing less significant bits of the address as shown in FIG. 9. The structure of the table provides for fast lookup and the ability to expand the volume. For fast lookup, the multi-level index structure keeps the table shallow with multiple entries at each level. The index performs array lookups at each level. To support volume expansion, the multi-level index structure allows for the addition of another layer to support expansion. Volume expansion in this case is the expansion of the LBA count presented to the upper layer, and not the actual amount of storage space allocated for the volume.

The multi-level index contains a summary of the entire volume data page remapping. Each PITC contains a complete remapping list for the volume at the point-in-time it is committed.

The multi-level index structure uses different entry types for the levels of the table. The different entry types support the need to read the information from the disk, as well as store it in memory. The bottom level entries may only contain data page pointers. The top and middle level entries contain two arrays, one for the LBA of the next level table entry, and a memory pointer to the table.

As the presented volume size expands, the size of previous PITC tables does not need to increase, and the tables do not need to be modified. The information in the table may not change, since it is read only, and the expand process modifies the table by adding NULL page pointers to the end. Snapshot does not directly present the tables from previous PITC to the user.

An I/O operation asks the table to map an LBA to a data page pointer. The I/O then multiplies the data page pointer times the data page size to get the LBA of the underlying RAID. In one embodiment, data page size is a power of two.

The table provides an API to remap LBA, add page, and coalesce table.

Figure 10:
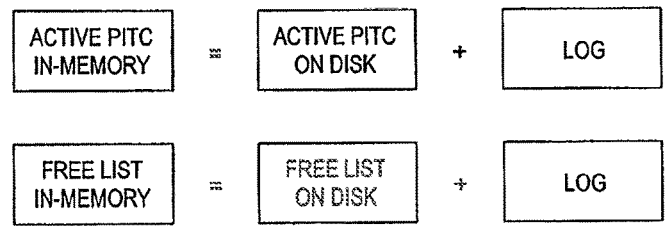
FIG. 10 illustrates one embodiment of recovery of a PITC table in accordance with the principles of the present invention.

Snapshot uses the data pages to store the PITC object and the LBA mapping tables. The tables directly access the RAID interface for I/O to its table entries. The table minimizes modification when reading and writing the table to the RAID device. Without modification, it becomes possible to read and write the table information directly into table entry structures. This reduces copies needed for I/O. Snapshot may use a change log to prevent the creation of hot-spots on the disk. A hot-spot is a location that is used repeatedly to track updates to the volume. The change log records updates to the PITC table, and the free list for the volume. During recovery, snapshot uses the change log to re-create the in-memory AP and free list. FIG. 10 illustrates one embodiment of recovery of a table, which demonstrates the relationship among the in-memory AP, the on-disk AP, and the change log. It also shows the same relationship for the free list. The in-memory AP table may be rebuilt from the on-disk AP table and the log. For any controller failure, the AP is rebuilt by reading the on-disk AP and applying the log changes to it. The change log uses different physical resources depending on system configuration. For multiple-controller systems, the change log relies on battery-backup cache memory for storage. Using cache memory allows snapshot to reduce the number of table writes to disk while maintaining data integrity. The change log replicates to a backup controller for recovery. For single-controller systems, the change log writes all information to the disks. This has the side-effect of creating a hot-spot on the disk at the log location. This allows a number of changes to be written to a single device block.

Periodically, snapshot writes the PITC table and free list to disk, creating a checkpoint in the log and clearing it. This period may vary depending on the number of updates to the PITC. The coalesce process does not use the change log.

Snapshot data page I/O may require requests fit within the data page boundaries. If snapshot encounters an I/O request that spans the page boundaries it splits the request. It then passes the requests down to the request handlers. The write and read sections assume that an I/O fits within the page boundaries. The AP provides the LBA remapping to satisfy I/O requests.

Figure 11:
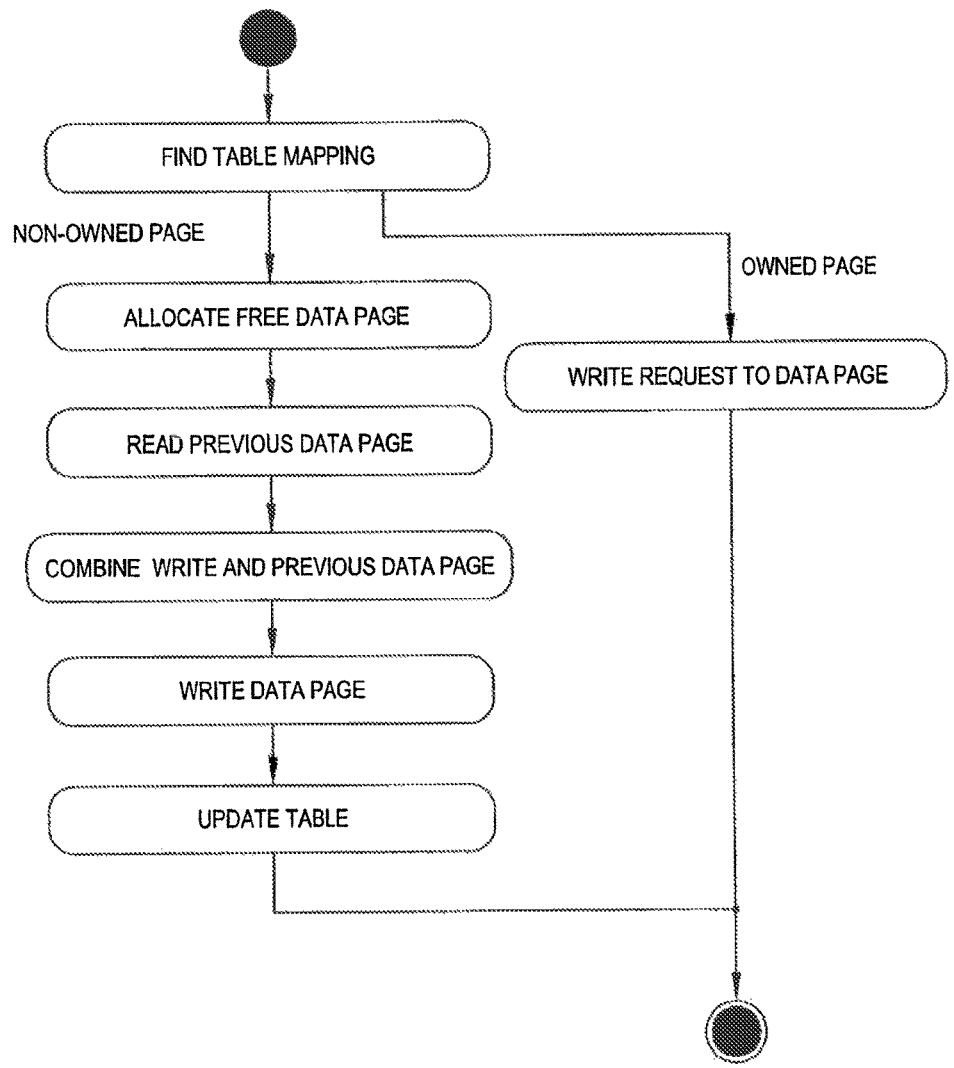
FIG. 11 illustrates one embodiment of a write process having an owned page sequence and a non-owned page sequence in accordance with the principles of the present invention.

The AP satisfies all write requests. Snapshot supports two different write sequences for owned and non-owned pages. The different sequence allow for the addition of pages to the table. FIG. 11 illustrates one embodiment of a write process having an owned page sequence and a non-owned page sequence.

For the owned page sequence, the process includes the following:
1) Find the table mapping; and
2) Page Owned Write—Remap the LBA and write the data to the RAID interface.

A previously written page is the simple write request. Snapshot writes the data to the page, overwriting the current contents. Only data pages owned by the AP will be written. Pages owned by other PITC is read only.

For the non-owned page sequence, the process includes the following:
1) Find the table mapping;
2) Read previous Page—Perform a read to the data page such that the write request and the read data make up the complete page. This is the start of the copy on write process.
3) Combine the data—Put the data page read and the write request payloads into a single contiguous block.
4) Free List Allocate—Get a new data page pointer from the free list.
5) Write the combined data to the new data page.
6) Commit the new page information to the log.

7) Update the table—Change the LBA remapping in the table to reflect the new data page pointer. The data page is now owned by the PITC.

Adding a page may require blocking read and write requests until the page is added to the table. By writing the table updates to disk and keeping multiple cached copies of the log, snapshot achieves controller coherency.

With respect to read requests, the AP fulfills all read requests. Using the AP table the read request remaps the LBA to the LBA of the data page. It passes the remapped LBA to the RAID interface to satisfy the request. A volume may fulfill a read requests for a data page not previously written to the volume. These pages are marked with the NULL Address (All one's) in the PITC table. Requests to this address are satisfied by the NULL volume and return a constant data pattern. Pages owned by different PITC may satisfy a read request spanning page boundaries.

Snapshot uses a NULL volume to satisfy read requests to previously unwritten data pages. It returns all zeroes for each sector read. It does not have a RAID device or allocated space. It is anticipated that a block of all zeroes be kept in memory to satisfy the data requirements for a read to the NULL volume. All volumes share the NULL volume to satisfy read requests.

In one embodiment, a coalesce process removes a PITC and some of its owned pages from the volume. Removing the PITC creates more available space to track new differences. Coalescing compares two adjacent tables for differences and keeps only the newer differences. Coalescing occurs periodically or manually according to user configuration.

The process may include two PITC, the source and destination. The rules in one embodiment for eligible objects are as follows:

1) The source must be the previous PITC to the Destination—the source must be created before the destination.

2) A destination may not simultaneously be a source.

3) A source may not be referred to by multiple PITC. Multiple references occur when a view volume is created from a PITC.

4) The destination may support multiple references.

5) The AP may be a destination, but not a source.

The coalesce process writes all changes to disk and requires no coherency. If a controller fails, the volume recovers the PITC information from disk and resumes the coalesce process.

The process marks two PITC for coalescing and includes the following steps:

1) Source state set to coalesce source—the state is committed to disk for controller failure recovery. At his point source may no longer be accessed as its data pages may be invalid. The data pages may be returned to the free list, or ownership is transferred to destination.

2) Destination state set to coalesce destination—the state is committed to disk for controller failure recovery.

3) Load and compare tables—the process moves data page pointers. Freed data pages immediately are added to the free list.

4) Destination state set to normal—The process is complete.

5) Adjust the list—change the previous of the source next pointer to the destination. This effectively removes the source from the list.

6) Free the source—return any data pages used for control information to the free list.

The above process supports the combination of two PITC. It is appreciated to a person skilled in the art that coalesce can be designed to remove multiple PITC and create multiple sources in the single pass.

As shown in FIG. 2, the page pool maintains a data page free list for use by all volumes associated with the page pool. The free list manager uses data pages from the page pool to commit the free list to permanent storage. Free list updates come from a number of sources: the write process allocates pages, the control page manager allocates pages, and the coalescing process returns pages.

The free list may maintain a trigger to automatically expand itself at a certain threshold. The trigger uses the page pool expansion method to add pages to the page pool. The automatic expansion could be a function of volume policy. More important data volume would be allowed to expand while less important volumes are forced to coalesce.

View volumes provide access to previous points-in-time and support normal volume I/O operations. A PITC tracks the difference between PITC, and the view volume allows the user to access the information contained within a PITC. A view volume branches from a PITC. View volumes support recovery, test, backup operations, etc. View volume creation occurs nearly instantaneously as it requires no data copies. The view volume may require its own AP to support writes to the view volume.

A view taken from the current state of the volume the AP may be copied from the current volume AP. Using the AP, the view volume allows write operations to the view volume without modifying the underlying data. The OS may require a file system or file rebuild to use the data. The view volume allocates space from the parent volume for the AP and written data pages. The view volume has no associated RAID device information. Deleting the view volume frees the space back to the parent volume.

Figure 12:
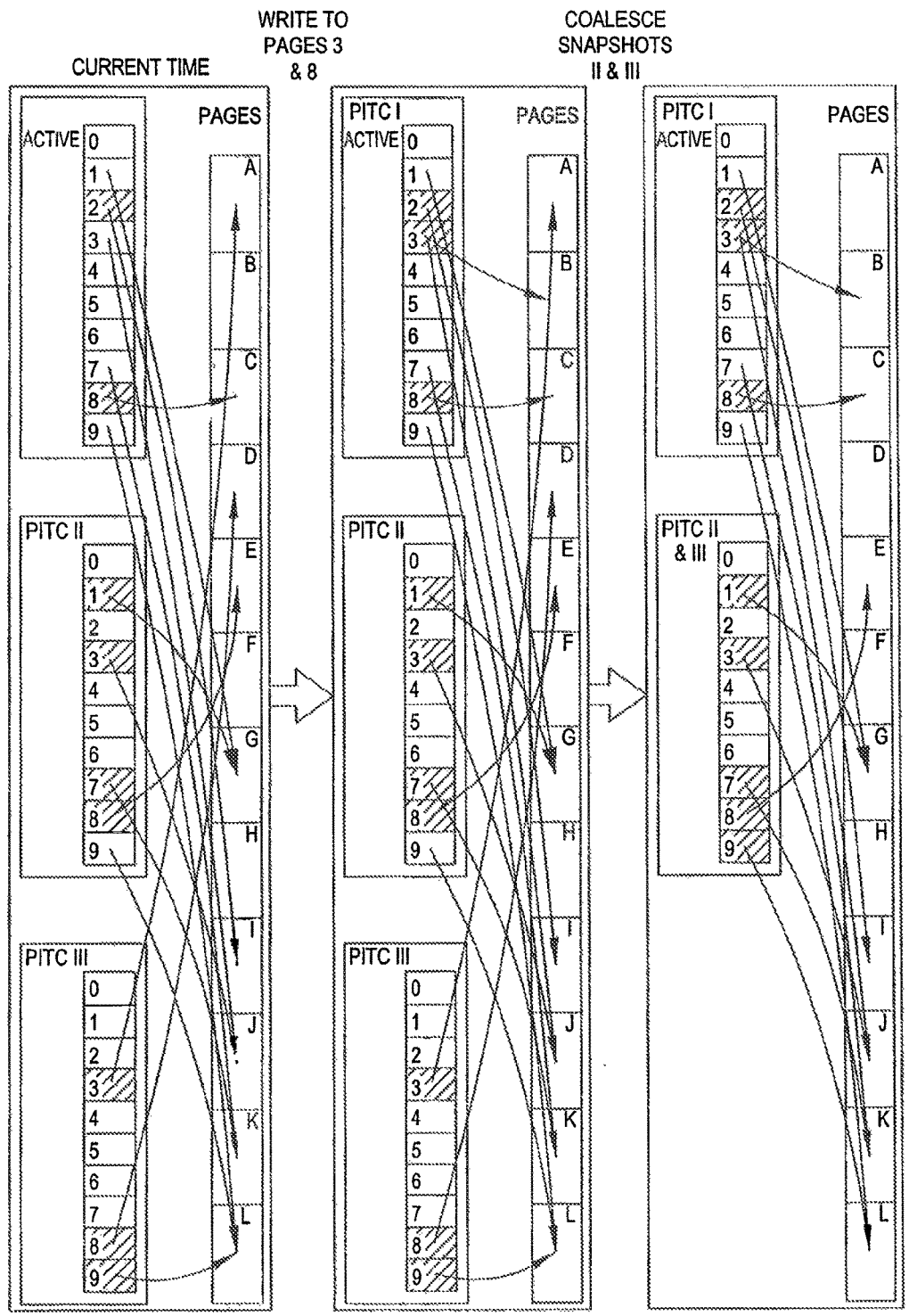
FIG. 12 illustrates an exemplary snapshot operation in accordance with the principles of the present invention.
Figure 13A:
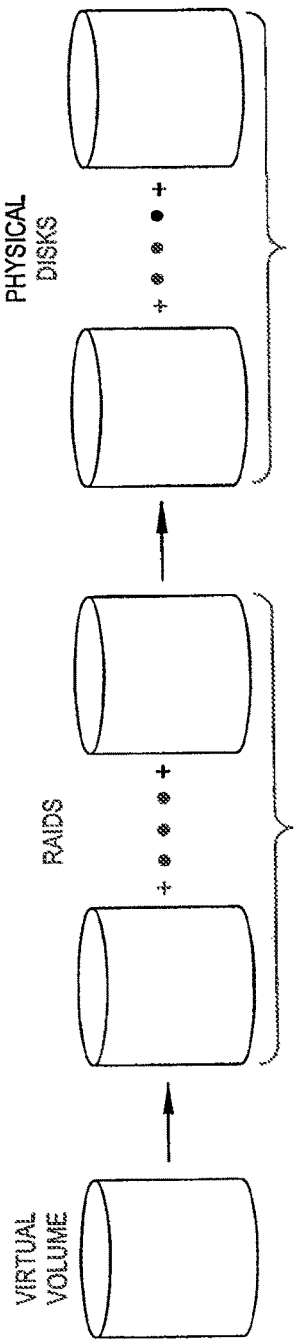
FIG. 13A illustrates a prior existing disk drive system having a virtual volume data storage space associated with physical disks with specific size and location for statically allocating data.
Figure 13B:
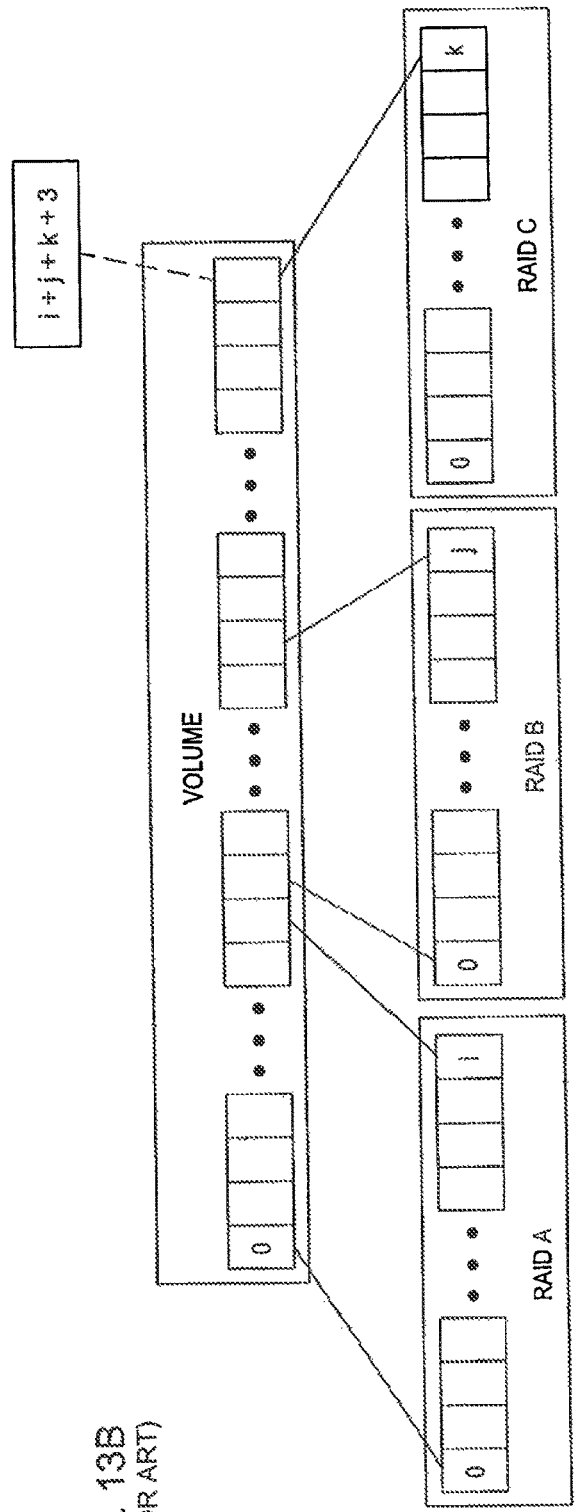
FIG. 13B illustrates a volume logical block mapping in the prior existing disk drive system of FIG. 13A.

FIG. 12 illustrates an exemplary snapshot operation showing the transitions for a volume using snapshot. FIG. 12 depicts a volume with ten pages. Each state includes a Read Request Fulfillment list for the volume. Shaded blocks indicate owned data page pointers.

The transition from the left of the figure (i.e. the initial state) to the middle of the figure shows the a write to pages 3 and 8. The write to page 3 requires a change to PITC I (AP). PITC I follows the new page write processing to add page 3 to the table. PITC reads unchanged information from page J and uses the drive page B to store the page. All future writes to page 3 in this PITC are handled without adding pages. The write to page 8 depicts the second case for writing to a page. Since PITC I already contains page 8, PITC I writes over that portion of the data in page 8. For this case, it exists on the drive page C.

The transition from the middle of the figure to the right of the figure (i.e. final state) shows the coalescing of PITC II and III. Snapshot coalescing involves removing older pages, respectively, while maintaining all the changes in both PITC. Both PITC contain pages 3 and 8. The process retains the newer pages from PITC II and frees the pages from PITC III, and it returns pages A and D to the free list.

Snapshot allocates data pages from the page pool to store free list and PITC table information. Control Page allocation sub-allocates the data pages to match the sizes needed by the objects.

A volume contains a page pointer for the top of the control page information. From this page all of the other information can be read.

Snapshot tracks the number of pages in-use at certain time intervals. This allows snapshot to predict when the user needs to add more physical disk space to the system to prevent snapshot from running out.

Data Progression

In one embodiment of the present invention, data progression (DP) is used to move data gradually to storage space of appropriate cost. The present invention allows a user to add drives when the drives are actually needed. This would significantly reduce the overall cost of the disk drives.

Data progression moves non-recently accessed data and historical snapshot data to less expensive storage. For non-recently accessed data, it gradually reduces the cost of storage for any page that has not been recently accessed. It may not move the data to the lowest cost storage immediately. For historical snapshot data, it moves the read-only pages to more efficient storage space, such as RAID 5, and to the least expensive storage if the page is no longer accessible by a volume.

The other advantages of the data progression of the present invention include maintaining fast I/O access to data currently being accessed, and reducing the need to purchase fast but expensive disk drives.

In operation, data progression determines the cost of storage using the cost of the physical media and the efficiency of RAID devices that are used for data protection. Data progression also determines the storage efficiency and moves the data accordingly. For example, data progression may convert RAID 10 to RAID 5 devices to more efficiently use the physical disk space.

Data progression defines accessible data as data that can be read or written by a server at the current time. It uses the accessibility to determine the class of storage a page should use. A page is read-only if it belongs to a historical PITC. If the server has not updated the page in the most recent PITC, the page is still accessible.

FIG. 17 illustrates one embodiment of accessible data pages in a data progression operation. The accessible data pages is broken down into the following categories:
 Accessible Recently Accessed—These are the active pages the volume is using the most.
 Accessible Non-recently accessed—Read-write pages that have not been recently used.
 Historical Accessible—Read-only pages that may be read by a volume—Applies to snapshot volumes.
 Historical Non-Accessible—Read-only data pages that are not being currently accessed by a volume—Applies to snapshot volumes. Snapshot maintains these pages for recovery purposes, and the pages are generally placed on the lowest cost storage possible.

In FIG. 17, three PITC with various owned pages for a snapshot volume are illustrated. A dynamic capacity volume is represented solely by PITC C. All of the pages are accessible and read-write. The pages may have different access time.

The following table illustrates various storage devices in an order of increasing efficiency or decreasing monetary expense. The list of storage devices may also follow a general order of slower write I/O access. Data progression computes efficiency of the logical protected space divided by the total physical space of a RAID device.

TABLE 1

RAID Types

| Type | Sub Type | Storage Efficiency | Block Write I/O Count | Usage |
| --- | --- | --- | --- | --- |
| RAID 10 | | 50% | 2 | Primary Read-Write Accessible Storage with relatively good write performance. |
| RAID 5 | 3-Drive | 66.6% | 4 (2 Read-2 Write) | Minimum efficiency gain over RAID 10 while incurring the RAID 5 write penalty. |
| RAID 5 | 5-Drive | 80% | 4 (2 Read-2 Write) | Great candidate for Read-only historical information. Good candidate for non-recently accessed writable pages. |
| RAID 5 | 9-Drive | 88.8% | 4 (2 Read-2 Write) | Great candidate for read-only historical information. |
| RAID 5 | 17-Drive | 94.1% | 4 (2 Read-2 Write) | Reduced gain for efficiency while doubling the fault domain of a RAID device. |

RAID 5 efficiency increases as the number of drives in the stripe increases. As the number of disks in a stripe increases, the fault domain increases. The increasing the numbers of drives in a stripe also increases the minimum number of disk necessary to create the RAID devices. In one embodiment, data progression does not use a RAID 5 stripe size larger than 9 drives due to the increase in the fault domain size and the limited efficiency increase. Data progression uses RAID 5 stripe sizes that are integer multiple of the snapshot page size. This allows data progression to perform full-stripe writes when moving pages to RAID 5 making the move more efficient. All RAID 5 configurations have the same write I/O characteristic for data progression purpose. For example, RAID 5 on an 2.5 inch FC disk may not effectively use the performance of those disks well. To prevent this combination, data progression needs to support the ability to prevent a RAID Type from running on certain disk types. The configuration of data progression can also prevent the system from using RAID 10 or RAID 5 space.

The types of disks are shown in the following table:

TABLE 2

Disk Types

| Type | Speed | Cost | Issues |
| --- | --- | --- | --- |
| 2.5 Inch FC | Great | High | Very Expensive |
| FC 15 K RPM | Good | Medium | Expensive |
| FC 10 K RPM | Good | Good | Reasonable Price |
| SATA | Fair | Low | Cheap/Less Reliable |

Data progression includes the ability to automatically classify disk drives that are relative to the drives within a system. The system examines a disk to determine its performance relative to the other disks in the system. The faster disks are classified in a higher value classification, and the slower disks are classified in a lower value classification. As disks are added to the system, the system automatically rebalances the value classifications of the disks. This approach handles both the systems that never change and the systems that change frequently as new disks are added. The automatic classification may place multiple drive types within the same value classification. If the drives are determined to be close enough in value, then they have the same value.

In one embodiment, a system contains the following drives:

High—10K FC drive
Low—SATA drive

With the addition of a 15K FC drive, Data progression automatically reclassifies the disks and demotes the 10K FC drive. This results in the following classifications:

High—15K FC drive
Medium—10K FC drive
Low—SATA drive

In another embodiment, a system may have the following drive types:

High—25K FC drive
Low—15K FC drive

Accordingly, the 15K FC drive is classified as the lower value classification, whereas the 15K FC drive is classified as the higher value classification.

If a SATA drive is added to the system, Data progression automatically reclassifies the disks. This results in the following classification:

High—25K FC drive
Medium—15K FC drive
Low—SATA drive

Data progression may include waterfall progression. Typically, waterfall progression moves data to a less expensive resource only when the resource becomes totally used. The waterfall progression effectively maximizes the use of the most expensive system resources. It also minimizes the cost of the system. Adding cheap disks to the lowest pool creates a larger pool at the bottom.

Figure 24:
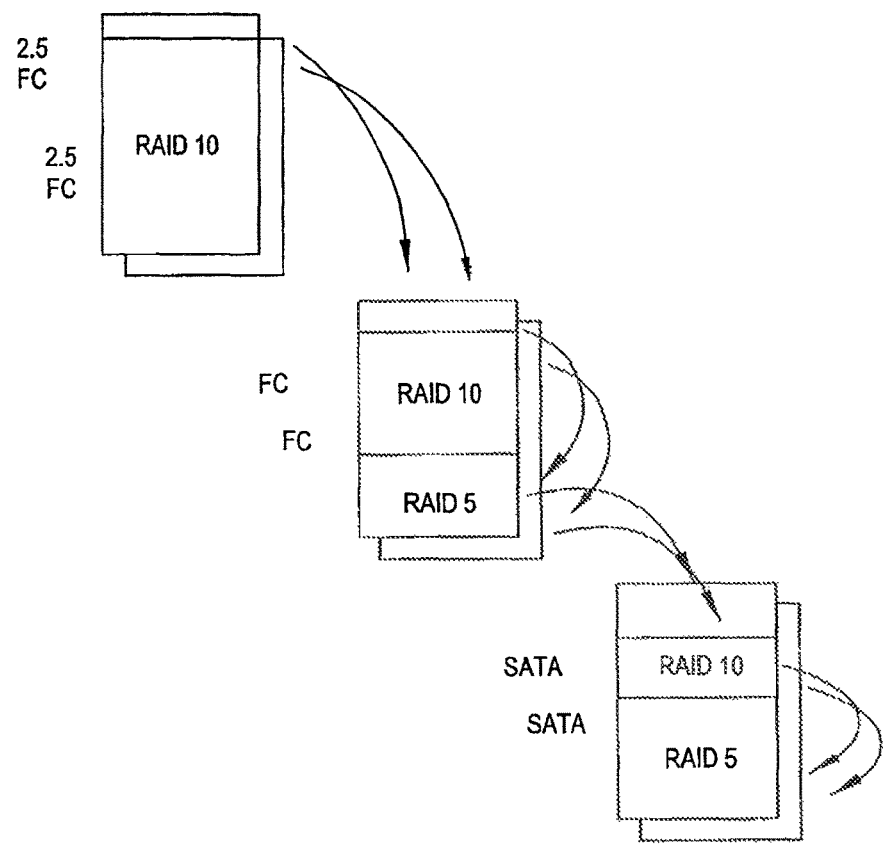
FIG. 24 illustrates one embodiment of a mixed RAID waterfall data progression in accordance with the principles of the present invention.

The typical waterfall progression uses RAID 10 space and then a next of RAID space, such as RAID 5 space. This forces the waterfall to go directly to RAID 10 of the next class of disks. Alternatively, data progression may include mixed RAID waterfall progression as shown in FIG. 24. This alternative data progression method solves the problem of maximizing disk space and performance and allows storage to transform into a more efficient form in the same disk class. This alternative method also supports the requirement that RAID 10 and RAID 5 share the total resource of a disk class. This may require configuring a fixed percentage of disk space a RAID level may use for a class of disks. Accordingly, the alternative data progression method maximizes the use of expensive storage, while allowing room for another RAID class to coexist.

The mixed RAID waterfall also only moves pages to less expensive storage when the storage is limited. A threshold value, such as a percentage of the total disk space, limits the amount of storage of a certain RAID type. This maximizes the use of the most expensive storage in the system. When a storage approaches its limit, data progression automatically moves the pages to lower cost storage. Data progression may provide a buffer for write spikes.

It is appreciated that the above waterfall methods may move pages immediately to the lowest cost storage as in some cases, there may be a need in moving historical and non-accessible pages onto less expensive storage in a timely fashion. Historical pages may also be instantly moved to less expensive storage.

Figure 18:
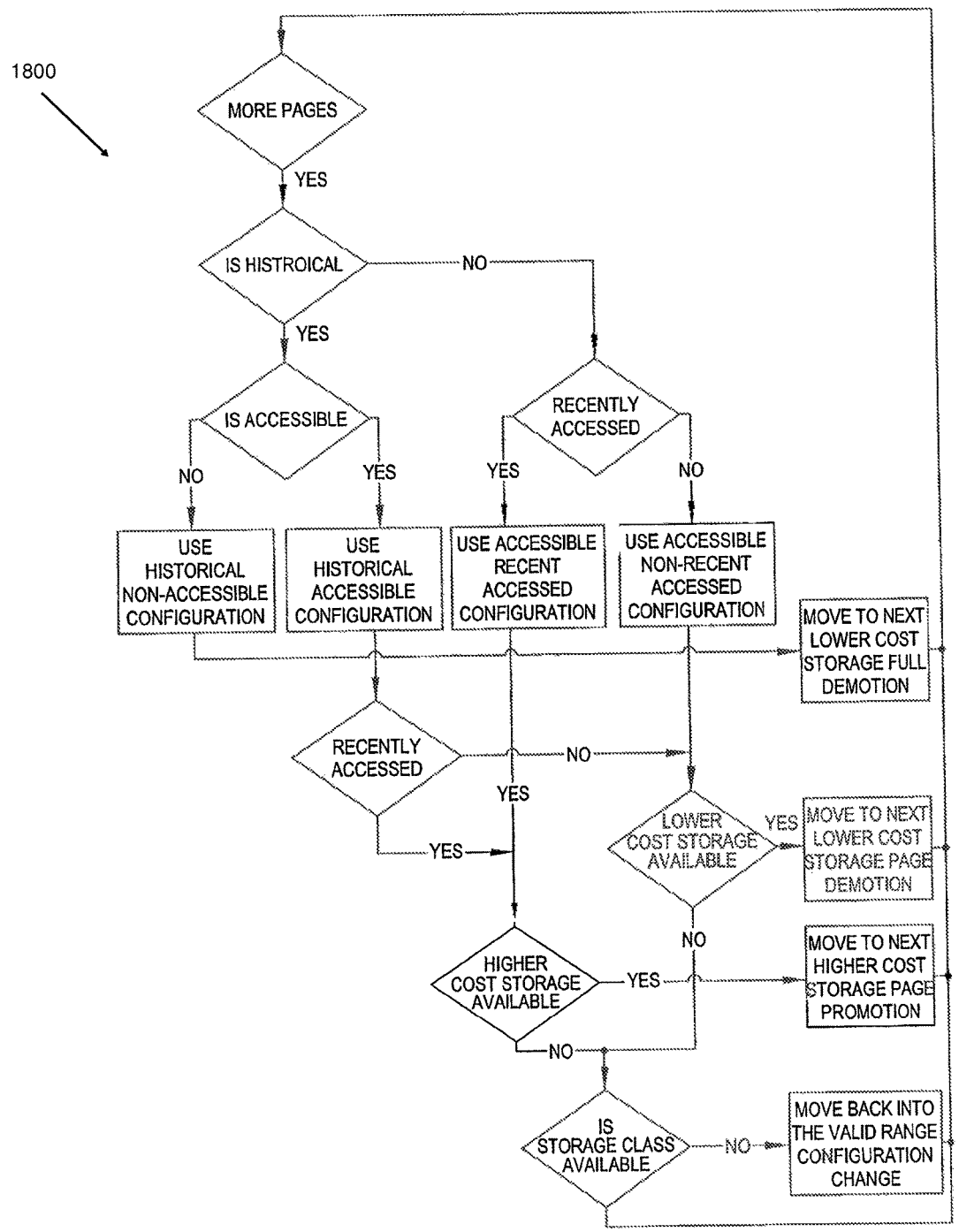
FIG. 18 illustrates a flow chart of one embodiment of a data progression process in accordance with the principles of the present invention.

FIG. 18 illustrates a flow chart of data progression process 1800. Data progression continuously checks each page in the system for its access pattern and storage cost to determine whether there are data pages to move. Data progression may also determine if the storage has reached its maximum allocation.

Data progression process determines if the page is accessible by any volume. The process checks PITC for each volume attached to a history to determine if the page is referenced. If the page is actively being used, the page may be eligible for promotion or a slow demotion. If the page is not accessible by any volume, it is moved to the lowest cost storage available. Data progression also factors in the time before a PITC expires. If snapshot schedules a PITC to expire shortly, no pages progress. If the page pool is operating in an aggressive mode, the pages may progress.

Data progression recent access detection needs to eliminate a burst of activity from promoting a page. Data progression separates read and write access tracking. This allows data progression to keep data on RAID 5 devices that are accessible. Operations like a virus scan or reporting only read the data. Data progression changes the qualifications of recent access when storage is running low. This allows data progression to more aggressively demote pages. It also helps fill the system from the bottom up when storage is running low.

Data progression may aggressively move data pages as system resources become low. More disks or a change in configuration are still necessary for all of these cases. Data progression lengthens the amount of time that the system may operate in a tight situation. Data progression attempts to keep the system operational as long as possible. The time is when all of its storage classes are out-of-space.

In the case where RAID 10 space is running low, and total available disk space is running low, data progression may cannibalize RAID 10 disk space to move to more efficient RAID 5. This increases the overall capacity of the system at the price of write performance. More disks are still necessary. If a particular storage class is completely used, data progression allows for borrowing on non-acceptable pages to keep the system running. For example, if a volume is configured to use RAID 10-FC for its accessible information, it may allocate pages from RAID 5-FC or RAID 10-SATA until more RAID10-FC space is available.

Data progression also supports compression to increase the perceived capacity of the system. Compression may only be used for historical pages that are not accessed, or as the storage of recovery information. Compression appears as another class of storage near the bottom of storage costs.

Figure 25:
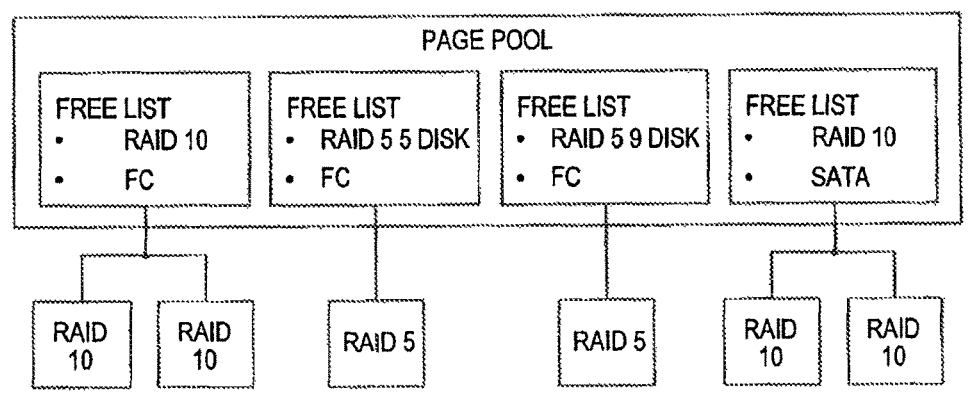
FIG. 25 illustrates one embodiment of multiple free lists of a page pool of storage in accordance with the principles of the present invention.

As shown in FIG. 25, the page pool essentially contains a free list and device information. The page pool needs to support multiple free lists, enhanced page allocation schemes, and the classification of free lists. The page pool maintains a separate free list for each class of storage. The allocation schemes allows a page to be allocated from one of many pools while setting minimum or maximum allowed classes. The classification of free lists comes from the device configuration. Each free list provides its own counters for statistics gathering and display. Each free list also provides the RAIL) device efficiency information for the gathering of storage efficiency stats.

In one embodiment, the device list may require the additional ability to track the cost of the storage class. The combination determines the class of the storage. This would occur if the user would like more or less granularity with the configured classes.

Figure 26:
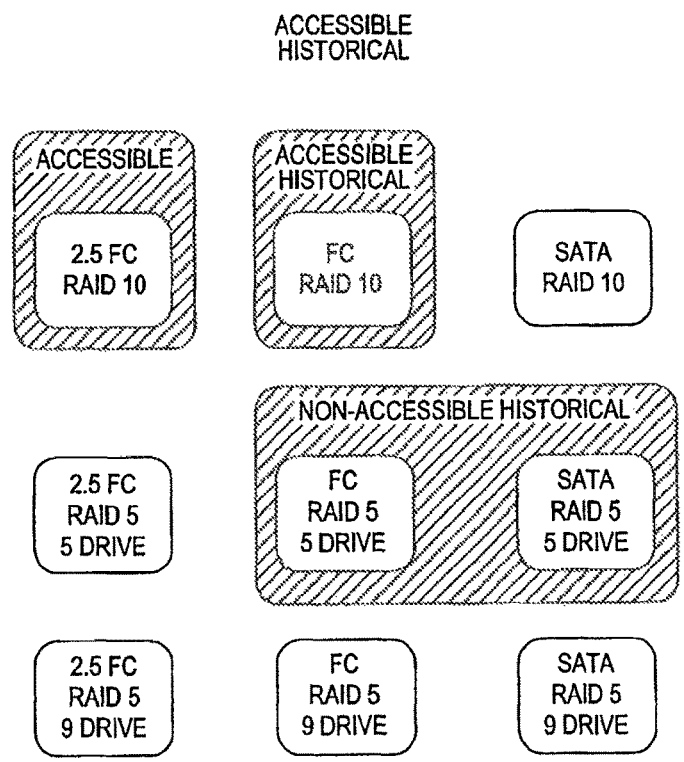
FIG. 26 illustrates one embodiment of a database example in accordance with the principles of the present invention.

FIG. 26 illustrates one embodiment of a high performance database where all accessible data only resides on 2.5 FC drives, even if it is not recently accessed. Non-accessible historical data is moved to RAID 5 fiber channel.

Figure 19:
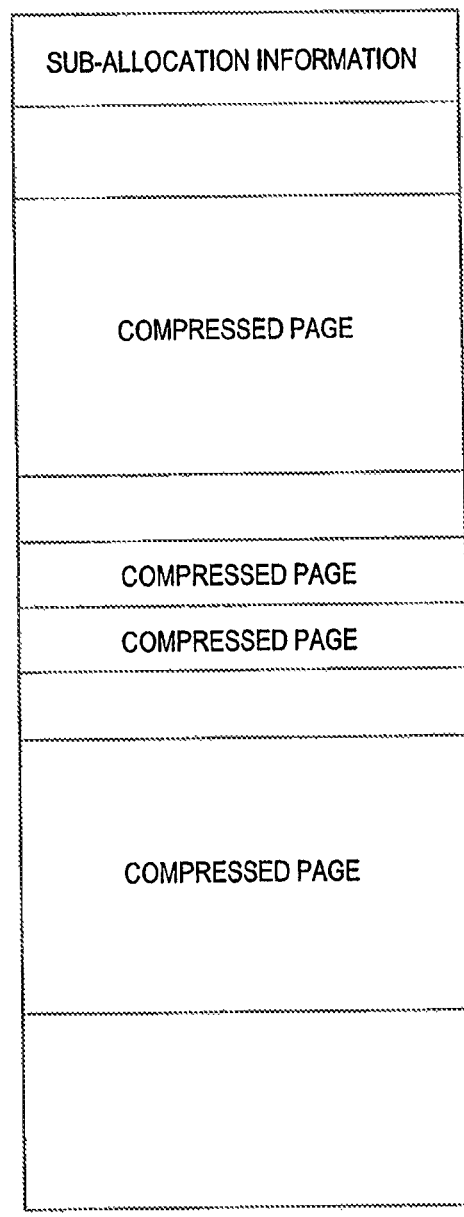
FIG. 19 illustrates one embodiment of compressed page layout in accordance with the principles of the present invention.
Figure 27:
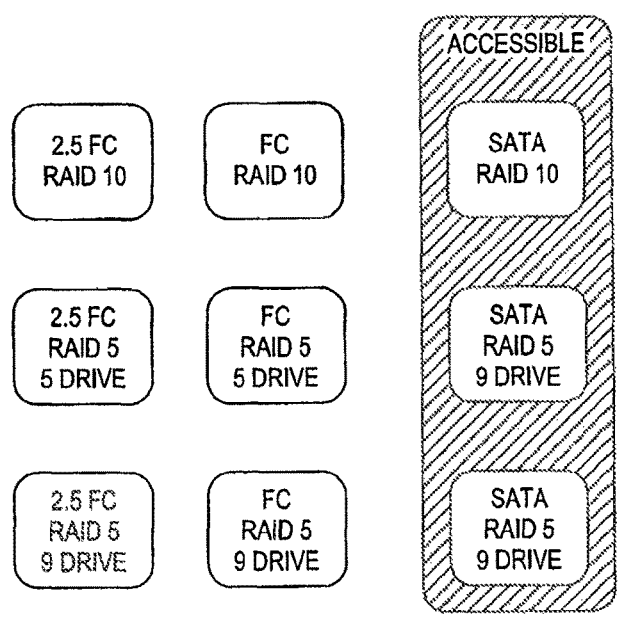
FIG. 27 illustrates one embodiment of a MRI image example in accordance with the principles of the present invention.

FIG. 27 illustrates one embodiment of a MRI image volume where accessible storage is SATA RAID 10 and RAID 5 for this dynamic volume. If the image is not recently accessed, the image is moved to RAID 5. New writes then go to RAID 10 initially. FIG. 19 illustrates one embodiment of a compressed page layout. Data progression implements compression by sub-allocating fixed sized data pages. The sub-allocation information tracks the free portions of the page, and the location of the allocated portions of the page. Data progression may not predict the efficiency of compression and may handle variable sized pages within its sub-allocation.

Compressed page may significantly impact CPU performance. For write access, a compressed page would require the entire page be decompressed and recompressed. Therefore, pages actively being accessed are not compressed, and returned to their non-compressed state. Writes may be necessary in conditions where storage is extremely limited.

The PITC remap table points to the sub-allocation information and is marked to indicate the page that is compressed. Accessing a compressed page may require a higher I/O count than a non-compressed page. The access may require the reading of the sub-allocation information to retrieve the location of the actual data. The compressed data may be read from the disk and decompressed on the processor.

Data progression may require compression to be able to decompress parts of the entire page. This allows data progression read access to only decompress small portions of the page. The read-ahead feature of read cache may help with the delays of compression. A single decompression may handle a number of server I/O. Data progression marks pages that are not good candidates for compression so that it does not continually attempt to compress a page.

Figure 20:
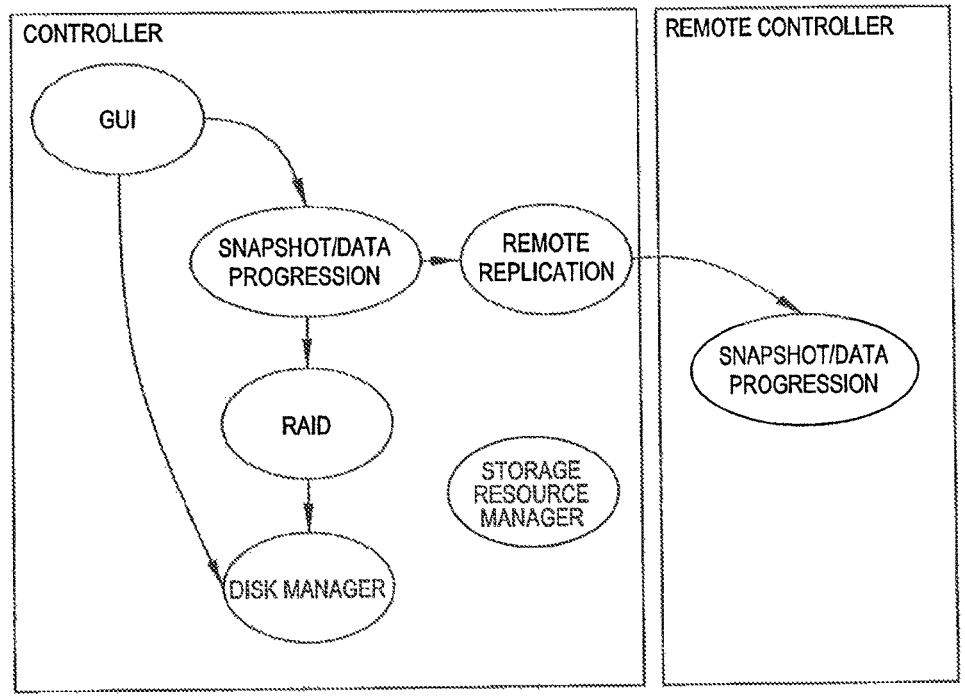
FIG. 20 illustrates one embodiment of data progression in a high level disk drive system in accordance with the principles of the present invention.

FIG. 20 illustrates one embodiment of data progression in a high level disk drive system in accordance with the principles of the present invention. Data Progression does not change the external behavior of a volume or the operation of the data path. Data progression may require modification to a page pool. The page pool essentially contains a free list and device information. The page pool needs to support multiple free lists, enhanced page allocation schemes, and the classification of free lists. The page pool maintains a separate free list for each class of storage. The allocation schemes allows a page to be allocated from one of many pools while setting minimum or maximum allowed classes. The classification of free lists may come from the device configuration. Each free list provides its own counters for statistics gathering and display. Each free list also provides the RAID device efficiency information for the gathering of storage efficiency statistics.

The PITC identifies candidates for movement and blocks 110 to accessible pages when they move. Data progression continually examines the PITC for candidates. The accessibility of pages continually changes due to server I/O, new snapshot page updates, and view volume creation/deletion. Data progression also continually checks volume configuration changes and summarize the current list of page classes and counts. This allows data progression to evaluate the summary and determine if there are possibly pages to be moved.

Each PITC presents a counter for the number of pages used for each class of storage. Data progression uses this information to identify a PITC that makes a good candidate to move pages when a threshold is reached.

RAID allocates a device from a set of disks based on the cost of the disks. RAID also provides an API to retrieve the efficiency of a device or potential device. It also needs to return information on the number of I/O required for a write operation. Data progression may also require a RAID NULL to use third-party RAID controllers as a part of data progression. RAID NULL may consume an entire disk and merely act as a pass through layer.

Disk manager may also automatically determine and store the disk classification. Automatically determining the disk classification may require changes to SCSI Initiator.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A method of data progression in a disk drive system, the method comprising:
   determining a cost of operating for each of a plurality of data storage devices, each data storage device storing data in a plurality of data pages;
   classifying each of the plurality of data storage devices based on cost;
   at time intervals, generating one or more snapshot point-in-time copies (PITCs) of the data for the plurality of data storage devices, each snapshot PITC identifying changes to the data stored in one or more data pages that have taken place since a previous snapshot PITC taken at a previous time interval;
   checking the one or more snapshot PITCs to determine whether data stored in a data page of a data storage device of a first classification has been recently accessed; and
   if the data stored in a data page stored on the data storage device of the first classification has been recently accessed, moving the data to one or more data storage devices of a second classification.

2. The method of claim 1, wherein the one or more data storage devices of the second classification each have a higher cost than the data storage device of the first classification.

3. The method of claim 1, wherein the cost of each data storage device is based on efficiency of the storage device relative to the other data storage devices.

4. The method of claim 1, wherein the cost of each data storage device is based on storage capacity of the data storage device.

5. The method of claim 1, wherein the cost of each data storage device is based on physical cost of the data storage device.

6. The method of claim 1, wherein the time intervals are user defined intervals.

7. The method of claim 1, wherein the time intervals are in a range of every few minutes to every few hours.

8. A method of data progression in a disk drive system, the method comprising:
- determining a cost of operating for each of a plurality of data storage devices, each data storage device storing data in a plurality of data pages;
- classifying each of the plurality of data storage devices based on cost;
- at time intervals, generating a point-in-time copy (PITC), the PITC initially being an active PITC that satisfies write requests to the plurality of data storage devices, thereby recording writes to the data stored in one or more data pages that have taken place since a previously active PITC;
- converting an active PITC to a snapshot PITC by committing the active PITC to disk as read-only, and subsequently moving data stored in the one or more data pages corresponding to the writes recorded while that PITC was active to one or more data storage devices of a second classification.

9. The method of claim 8, wherein the one or more data storage devices of the second classification each have a lower cost than the data storage device of the first classification.

10. The method of claim 8, wherein the cost of each data storage device is based on efficiency of the storage device relative to the other data storage devices.

11. The method of claim 8, wherein the cost of each data storage device is based on storage capacity of the data storage device.

12. The method of claim 8, wherein the cost of each data storage device is based on physical cost of the data storage device.

13. The method of claim 8, wherein the time intervals are user defined intervals.

14. The method of claim 8, wherein the time intervals are in a range of every few minutes to every few hours.

15. A disk drive system, comprising:
- one or more data storage devices of a first classification storing data in a plurality of data pages, the storage devices of the first classification having a cost;
- one or more data storage devices of a second classification storing data in a plurality of data pages, the storage devices of the second classification having a lower cost than that of the storage devices of the first classification;
- an active point-in-time-copy (PITC) satisfying writes to one or more data pages that have taken place since a previously active PITC, wherein the writes are stored on the one or more data storage devices of the first classification; and
- a historical PITC, being a previously active PITC that was committed to disk as read-only, identifying writes to data pages that occurred while it was an active PITC, wherein the writes to the data are stored on the one or more data storage devices of the second classification.

16. The disk drive system of claim 15, wherein the cost of each of the storage devices is based on efficiency of the storage device relative to one another.

17. The disk drive system of claim 15, wherein the cost of each of the storage devices is based on storage capacity of the storage device.

18. The disk drive system of claim 15, wherein the cost of each of the storage devices is based on physical cost of the storage device.

* * * * *